United States Patent
Ozeki et al.

(10) Patent No.: US 11,485,314 B2
(45) Date of Patent: Nov. 1, 2022

(54) AIRBAG DEVICE FOR PEDESTRIAN PROTECTION

(71) Applicant: TOYODA GOSEI CO., LTD., Kiyosu (JP)

(72) Inventors: Makoto Ozeki, Kiyosu (JP); Akira Yasuda, Kiyosu (JP); Taizo Suemitsu, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 17/510,493

(22) Filed: Oct. 26, 2021

(65) Prior Publication Data
US 2022/0153224 A1   May 19, 2022

(30) Foreign Application Priority Data
Nov. 16, 2020   (JP) .............................. JP2020-190518

(51) Int. Cl.
| | |
|---|---|
| *B60R 21/201* | (2011.01) |
| *B60R 21/36* | (2011.01) |
| *B60R 21/34* | (2011.01) |
| *B60R 21/20* | (2011.01) |
| *B60R 21/00* | (2006.01) |
| *B60R 21/2338* | (2011.01) |

(52) U.S. Cl.
CPC .............. *B60R 21/36* (2013.01); *B60R 21/20* (2013.01); *B60R 21/201* (2013.01); *B60R 21/34* (2013.01); *B60R 2021/0004* (2013.01); *B60R 2021/0027* (2013.01); *B60R 2021/23386* (2013.01)

(58) Field of Classification Search
CPC ..... B60R 21/20; B60R 21/201; B60R 21/237; B60R 21/34; B60R 21/36; B60R 2021/0027; B60R 2021/23386; B60R 2021/2375
See application file for complete search history.

(56) References Cited

U.S. PATENT DOCUMENTS

| | | | |
|---|---|---|---|
| 6,880,666 B2 * | 4/2005 | Kikuchi .............. | B60R 21/2338 180/274 |
| 7,172,048 B2 * | 2/2007 | Hamada .............. | B60R 21/2338 180/274 |

(Continued)

FOREIGN PATENT DOCUMENTS

| | | |
|---|---|---|
| JP | 2016-168995 A | 9/2016 |
| JP | 2020-100378 A | 7/2020 |

*Primary Examiner* — Barry Gooden, Jr.
(74) *Attorney, Agent, or Firm* — Posz Law Group, PLC

(57) ABSTRACT

An airbag device for pedestrian protection includes means for shrinking and tying an airbag after deployment toward the storage. The airbag device includes a protecting sheet that is folded together with the airbag and stored in the storage, and a wrapping sheet that wraps the airbag as folded. The protecting sheet includes a main body and a plurality of straps disposed in a periphery of the main body. The wrapping sheet includes a rupturable portion that is configured to rupture and split the wrapping sheet into a front portion and a rear portion at airbag deployment, and a plurality of through holes each for receiving the straps in a vicinity of the rupturable portion in the front portion. The deployed airbag is shrank and tied toward the storage by passing the straps through the through holes and tying them so the straps do not come off of the through holes.

6 Claims, 16 Drawing Sheets

(56) References Cited

U.S. PATENT DOCUMENTS

| | | | | |
|---|---|---|---|---|
| 8,727,061 | B2* | 5/2014 | Rydsmo | B60R 21/36 |
| | | | | 180/274 |
| 9,174,605 | B2* | 11/2015 | Choi | B60R 21/36 |
| 9,511,740 | B2* | 12/2016 | Park | B60R 21/2338 |
| 10,099,649 | B2* | 10/2018 | Osanai | B60R 21/36 |
| 2006/0151228 | A1* | 7/2006 | Kalliske | B60R 21/2338 |
| | | | | 180/274 |
| 2007/0046009 | A1* | 3/2007 | Miura | B60R 21/2338 |
| | | | | 280/730.2 |
| 2009/0102167 | A1* | 4/2009 | Kitte | B60R 21/2338 |
| | | | | 280/743.2 |
| 2014/0027195 | A1* | 1/2014 | Kalliske | B60R 21/34 |
| | | | | 180/271 |
| 2015/0175121 | A1* | 6/2015 | Choi | B60R 21/2338 |
| | | | | 180/274 |

\* cited by examiner

FIG. 12
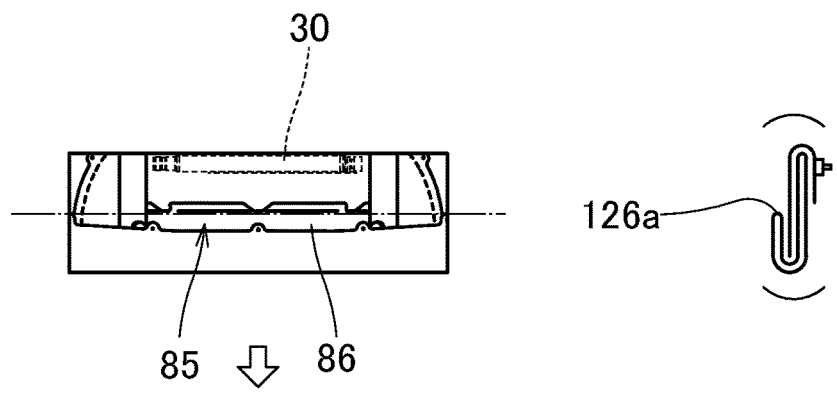
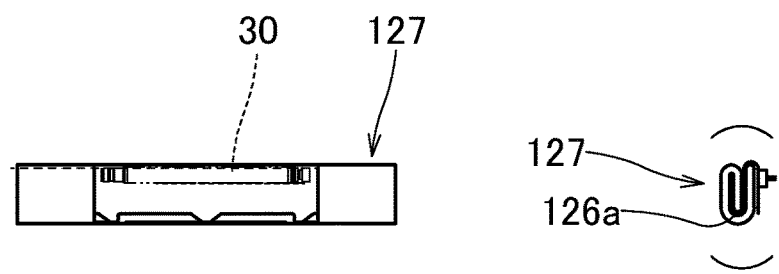
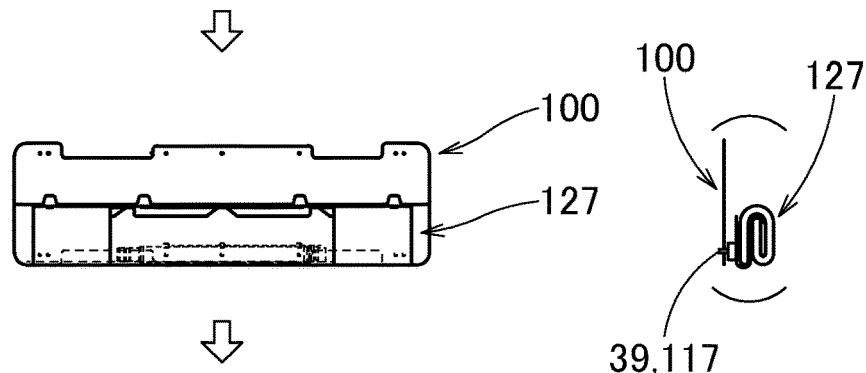
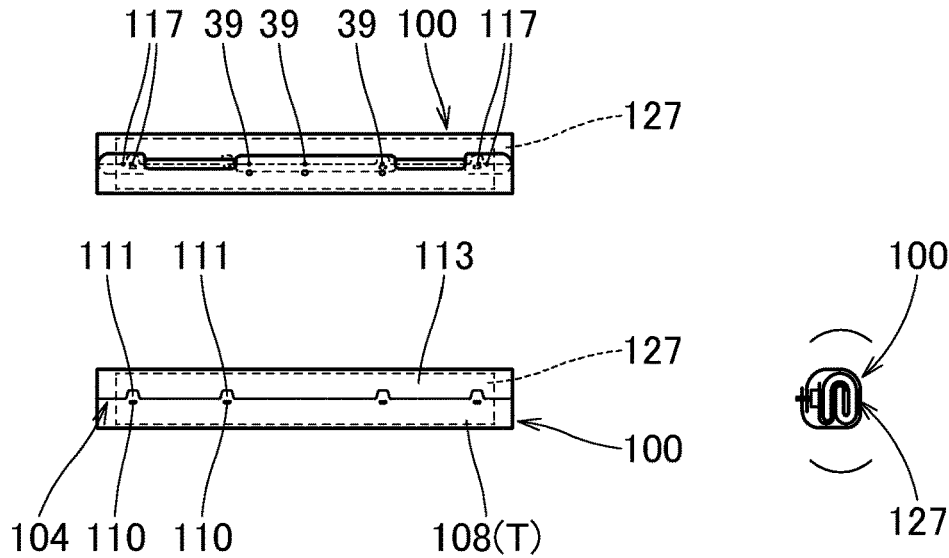

FIG. 16
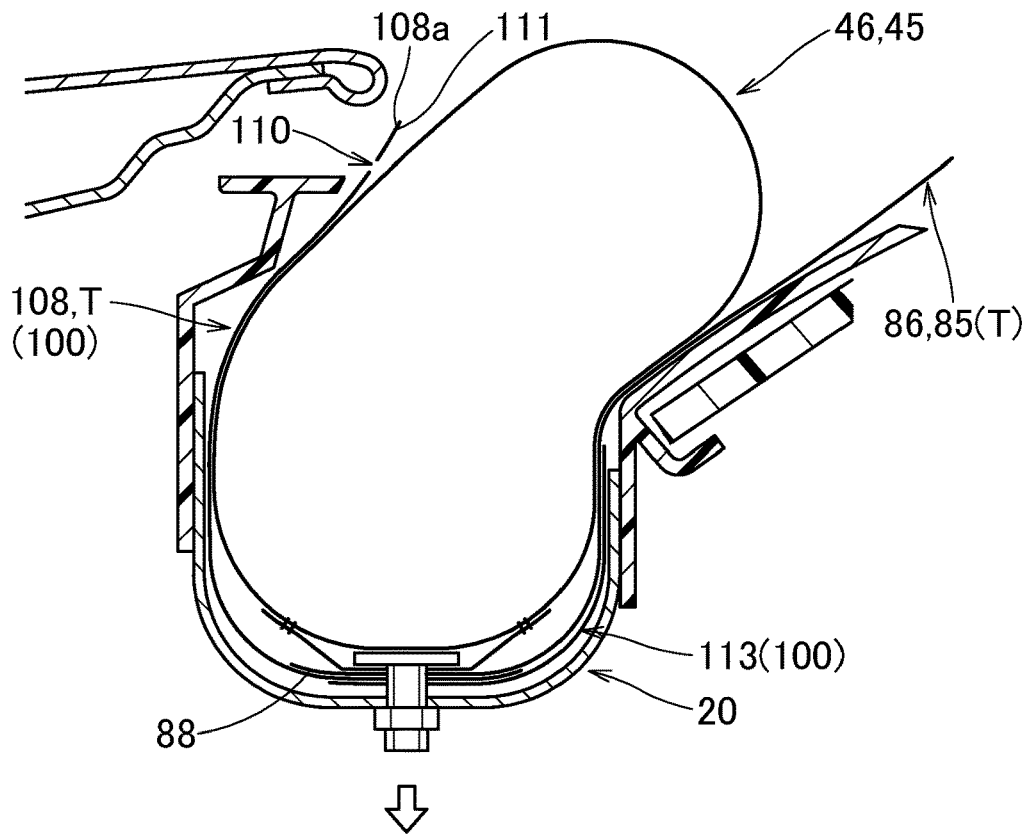
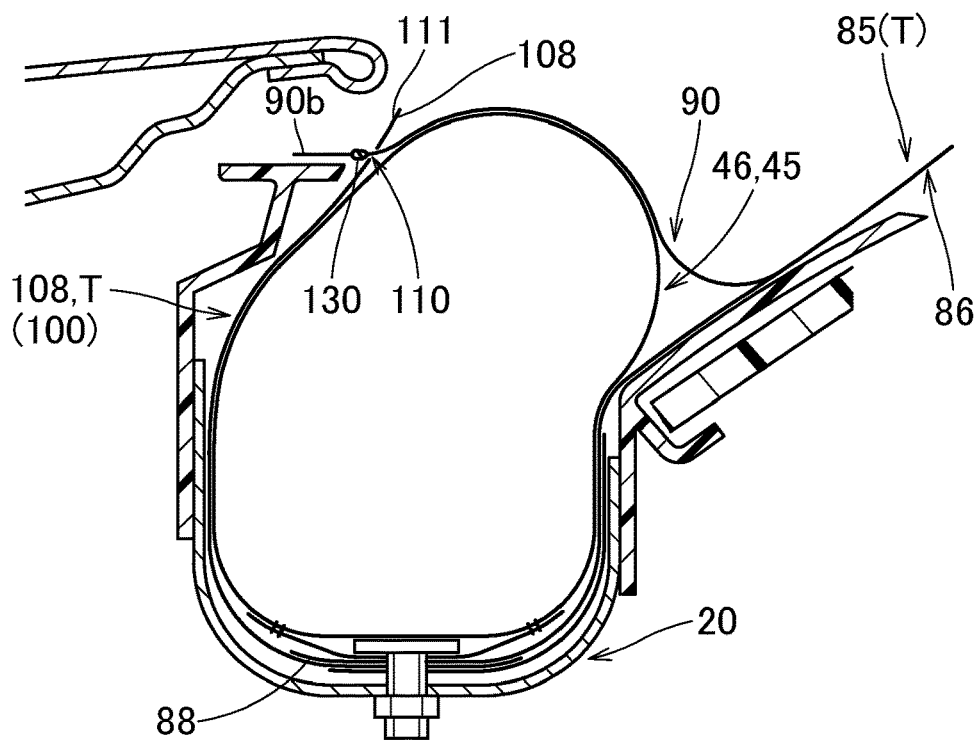

AIRBAG DEVICE FOR PEDESTRIAN PROTECTION

CROSS REFERENCE TO RELATED APPLICATIONS

The present application claims priority from Japanese Patent Application No. 2020-190518 of Ozeki et al., filed on Nov. 16, 2020, the entire disclosure of which is incorporated herein by reference.

BACKGROUND

1. Technical Field

The present disclosure relates to an airbag device for pedestrian protection that is adapted to be mounted on a vicinity of the rear end of a vehicle hood. More particularly, the disclosure relates to an airbag device for pedestrian protection that includes an airbag which is stored in a folded-up configuration and configured to be inflated with an inflation gas to cover the front surface of at least a lower portion of the windshield.

2. Description of Related Art

An airbag of an airbag device for pedestrian protection is configured to be deployed over a lower portion of the windshield on the front surface of the windshield. The airbag after deployment must be deflated and pulled up toward the storage because the airbag, if stays deployed over the windshield, would reduce the eyesight of the driver who needs to drive the vehicle thereafter. In order to solve this problem, JP 2016-168995 A discloses an airbag device for pedestrian protection that includes means for shrinking and tying the airbag after deployment. As the means for shrinking and tying, the airbag includes four straps each of which extends from a vicinity of a corner of the airbag in the front surface (in the surface facing away from the vehicle body) of the airbag as laid flat. The airbag is configured to be reduced in size by being tied by the straps. However, there is a room for improvement for reducing the size of the airbag having deployed more compactly.

SUMMARY

An exemplary embodiment of the present disclosure relates to an airbag device for pedestrian protection adapted to be mounted on a vehicle, the airbag device includes:

a storage that is adapted to be mounted on a vicinity of a rear end of a hood of the vehicle;

an airbag that is stored in the storage in a folded-up configuration, the airbag being configured to be inflated and deployed over a front surface of at least a lower portion of a windshield of the vehicle;

a protecting sheet that is formed of a sheet material having flexibility and has been folded together with the airbag and stored in the storage, the protecting sheet being joined to the storage by a front end thereof, the protecting sheet including a main body that is configured to unfold and extend rearward from the storage at airbag deployment to cover an underside of the airbag as deployed, and a plurality of straps that are disposed side by side in a left and right direction of the main body in a circumferential edge of the main body, wherein each of the plurality of straps is arranged substantially along the circumferential edge of the main body with a leading-end portion and a base portion thereof joined to the main body due to a continuous slit formed in a vicinity of the circumferential edge of the main body, and wherein the leading-end portion is configured to be disconnectable from the main body while the base portion is configured to stay joined to the main body; and a wrapping sheet that is formed of a sheet material having flexibility and wraps the airbag in order to keep the folded-up configuration of the airbag, the wrapping sheet including a rupturable portion that includes a plurality of intermittent slits extending substantially in a left and right direction of the wrapping sheet and is configured to rupture at airbag deployment to split an entirety of a portion of the wrapping sheet covering an upper surface of the airbag into a front portion and a rear portion, the wrapping sheet further including, in a vicinity of the rupturable portion in the front portion, a plurality of through holes each for receiving corresponding one of the plurality of straps, whereby at least the front portion of the wrapping sheet and the protecting sheet constitute means for shrinking and tying the airbag after deployment toward the storage by passing each of the plurality of straps with the leading-end portion disconnected from the main body of the protecting sheet through each of the through holes of the wrapping sheet and tying the leading-end portion of each of the straps so as to prevent disengagement of the strap from the through hole.

BRIEF DESCRIPTION OF DRAWINGS

FIG. 12 schematically illustrates later steps of the folding process shown in FIG. 11, which includes a step in which the airbag as folded up is wrapped by the wrapping sheet.

FIG. 16 illustrates the way the airbag having deployed is shrank and tied toward the storage with the shrinking and tying means by schematic partial enlarged vertical sectional views, in the airbag device in accordance with the exemplary embodiment.

DETAILED DESCRIPTION

Exemplary embodiments of the present disclosure are described below with reference to the accompanying drawings. However, the invention is not limited to the embodiments disclosed herein. All modifications within the appended claims and equivalents relative thereto are intended to be encompassed in the scope of the claims.

Figure 1:
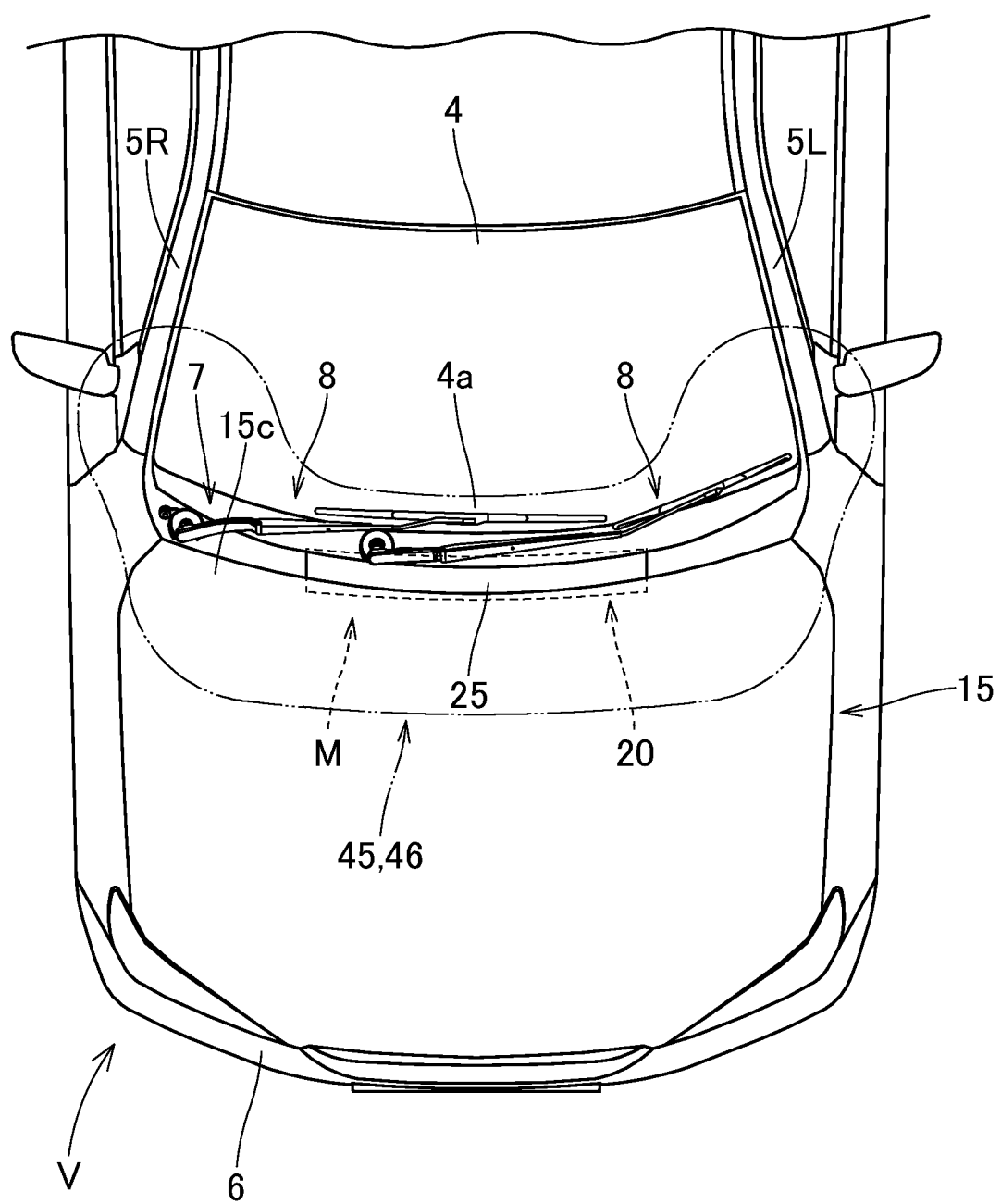
FIG. 1 is a plan view of a vehicle equipped with an airbag device for pedestrian protection in accordance with the exemplary embodiment.
Figure 2:
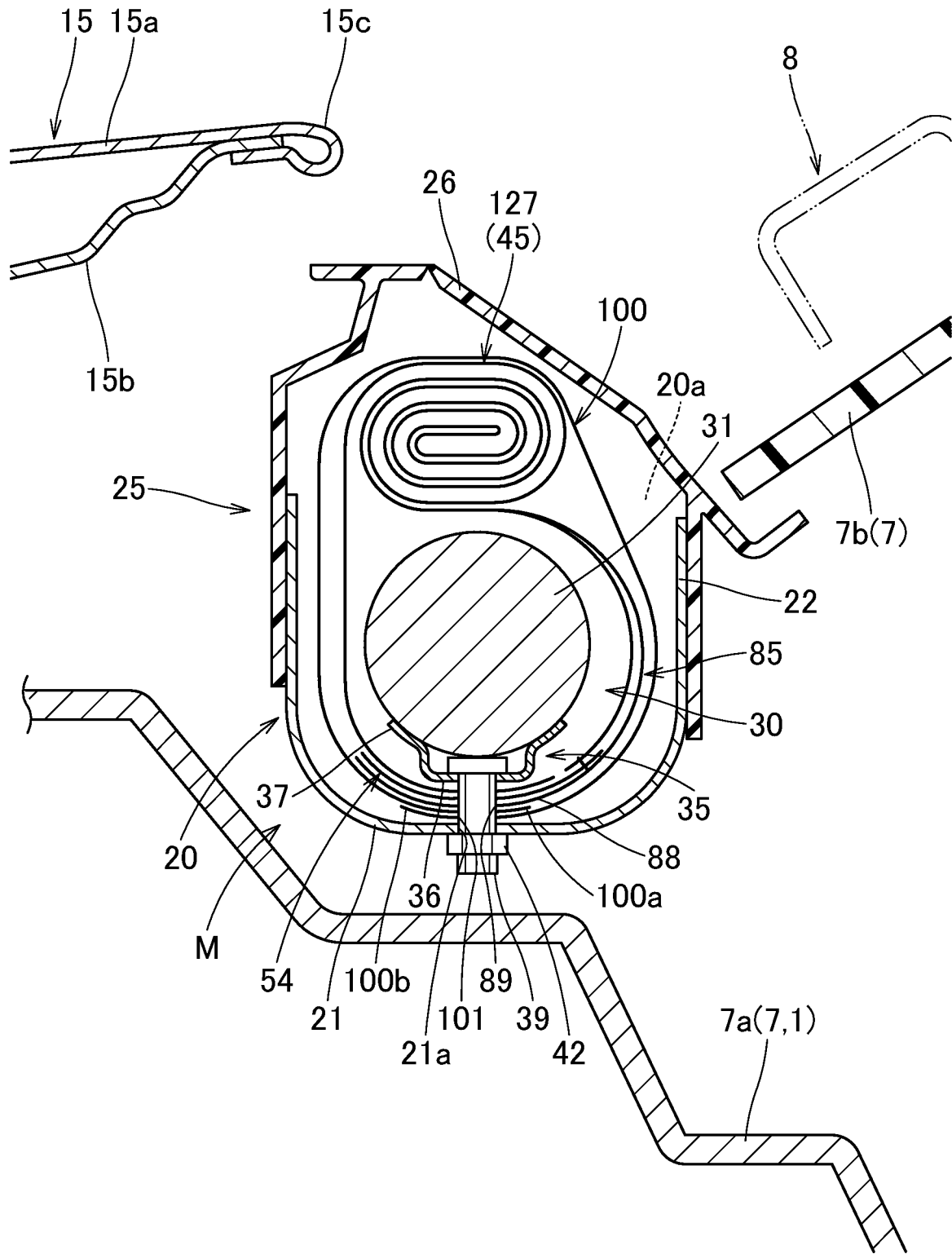
FIG. 2 is a schematic enlarged vertical sectional view of the airbag device of the exemplary embodiment taken along a front and rear direction at the location of an inflator.
Figure 3:
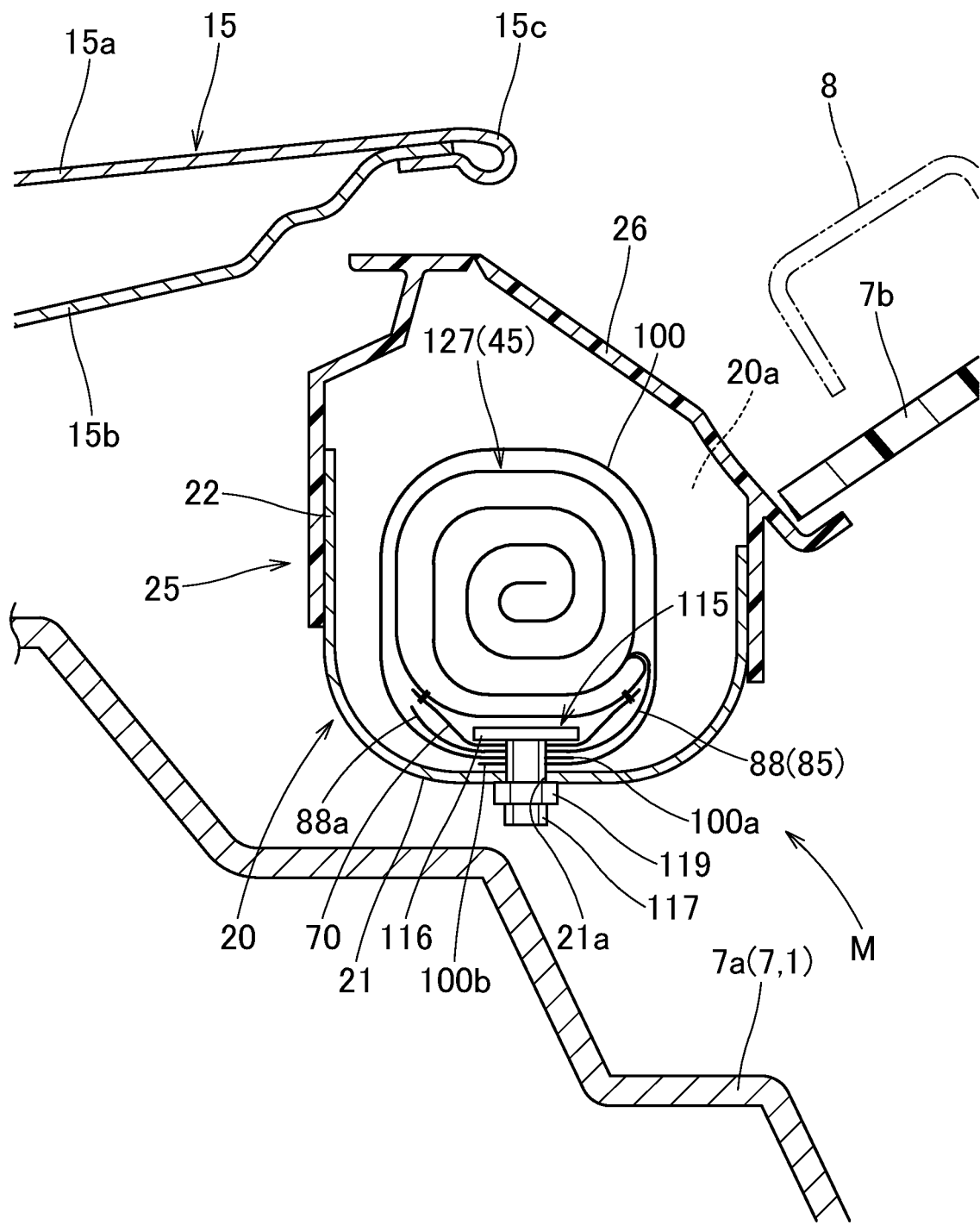
FIG. 3 is a schematic enlarged vertical sectional view of the airbag device of the exemplary embodiment taken along the front and rear direction at the location of a mounting bracket.

The airbag device M for pedestrian protection in accordance with an exemplary embodiment is disposed proximate to the rear end 15c of a hood 15 of a vehicle V, as shown in FIGS. 1 to 3. More particularly, the airbag device M is located proximate to and at the rear of the rear end 15c of the hood 15, substantially in a vicinity of the center in a left and right direction of the vehicle V between left and right front pillars 5L and 5R. Unless otherwise specified, front/rear, up/down and left/right directions in this description are intended to refer to front/rear, up/down and left/right directions of the vehicle V.

Figure 14:
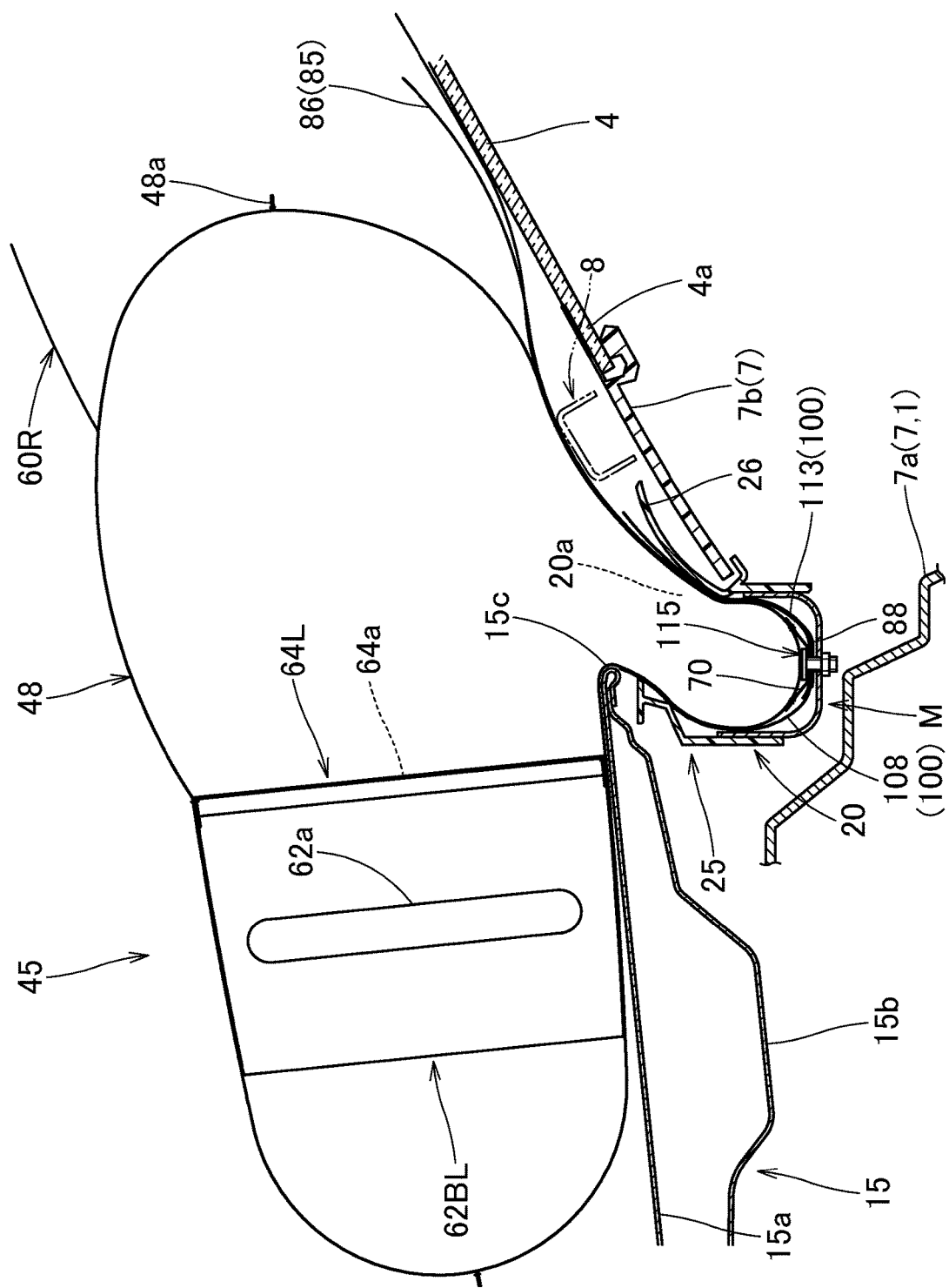
FIG. 14 is a schematic vertical sectional view of the airbag device of the exemplary embodiment as has deployed the airbag.

As shown in FIG. 1, the hood 15 covers an engine room of the vehicle V and is joined to the body structure 1 of the vehicle V with not-shown hinges in such a manner as to be openable forward. The hinges are each located in a vicinity of the rear end 15c of the left/right edge of the hood 15. The hood 15 of the illustrated embodiment is fabricated of plate material of steel or aluminum (aluminum alloy), and includes an outer panel 15a and an inner panel 15b, as shown in FIGS. 2, 3 and 14. As shown in FIG. 1, in order to fit a later-described windshield 4, the rear end 15c of the hood 15 is so designed in shape as to curve with respect to a left and right direction such that the center in the left and right direction is located forward whereas left and right end regions are located rearward.

As shown in FIGS. 2, 3 and 14, there is disposed a cowl 7 at the rear of the hood 15. The cowl 7 is composed of a cowl panel 7a which has high rigidity and belongs to the vehicle body structure 1, and a cowl louver 7b which is disposed above the cowl panel 7a and is fabricated of synthetic resin. The cowl louver 7b is continuous with the lower region 4a of the windshield 4 at the rear end. The cowl 7 is also shaped to curve along the curvature of the rear end 15c of the hood 15 (FIG. 1). As shown in FIG. 1, wipers 8 are disposed on the cowl 7. As indicated with dashed-and-double-dotted lines in FIGS. 2, 3 and 14, the wipers 8 are so disposed as to protrude upward from the cowl louver 7b. The front pillars 5L and 5R are located on the left and right of the windshield 4.

Referring to FIGS. 2 to 9, the airbag device M includes an airbag 45 that has a folded-up configuration, an inflator 30 that is configured to feed an inflation gas to the airbag 45, a case or storage 20 that stores the airbag 45 and inflator 30, an airbag cover 25 that covers the airbag 45, a protecting sheet 85 that has been folded together with the airbag 45 and stored in the case 20, a wrapping sheet 100 that wraps a folded-up body 127, a form of the airbag as folded up, and two mounting brackets 115 that mount later-described mounting portions 70 of the airbag 45 on the case 20.

The case 20 as the storage is located in a vicinity of the center in the left and right direction of the vehicle V between the left and right front pillars 5L and 5R and at the rear of the rear end 15c of the hood 15 in proximity to the rear end 15c. As can be seen in FIGS. 2 and 3, the case 20 is formed into an open-topped box that includes a bottom wall 21, a circumferential wall 22 which rises from the circumferential edge of the bottom wall 21 substantially in a square tubular shape, and an emergence opening 20a located at the top of the circumferential wall 22 for allowing emergence of the airbag 45. The bottom wall 21 includes a plurality of mounting holes 21a (FIGS. 2 to 4) for receiving later-described mounting bolts 39 and mounting bolts 117 to mount the inflator 30 and mounting portions 70 of the airbag 45 on the case 20, respectively. In the illustrated embodiment, later-described connecting portions 88 of the protecting sheet 85 are also mounted on the bottom wall 21 of the case 20 with the use of the mounting bolts 117. The case 20 of the illustrated embodiment is so positioned that the front portion is located immediately beneath the rear end 15c of the hood 15 while the rear portion is located farther rearward than the hood 15. The case 20 is mounted on the cowl panel 7a (i.e. on the vehicle body structure) through the use of not-shown one or more brackets. The case 20 is also shaped to curve along the curvature of the rear end 15c of the hood 15, as shown in FIG. 1.

The airbag cover 25 is formed from soft synthetic resin such as thermoplastic elastomer of polyolefin (TPO). As shown in FIGS. 2, 3, and 14, the airbag cover 25 covers the emergence opening 20a disposed in the upper portion of the case 20, and includes a door section 26 which is configured to open rearward for allowing airbag deployment when pushed by the airbag 45. The airbag cover 25 is fixed to the case 20 at predetermined portions with not-shown mounting means.

The inflator 35 includes an inflator body 31 and a mounting bracket 35 that is used to mount the inflator body 31 on the case 20.

Figure 4:
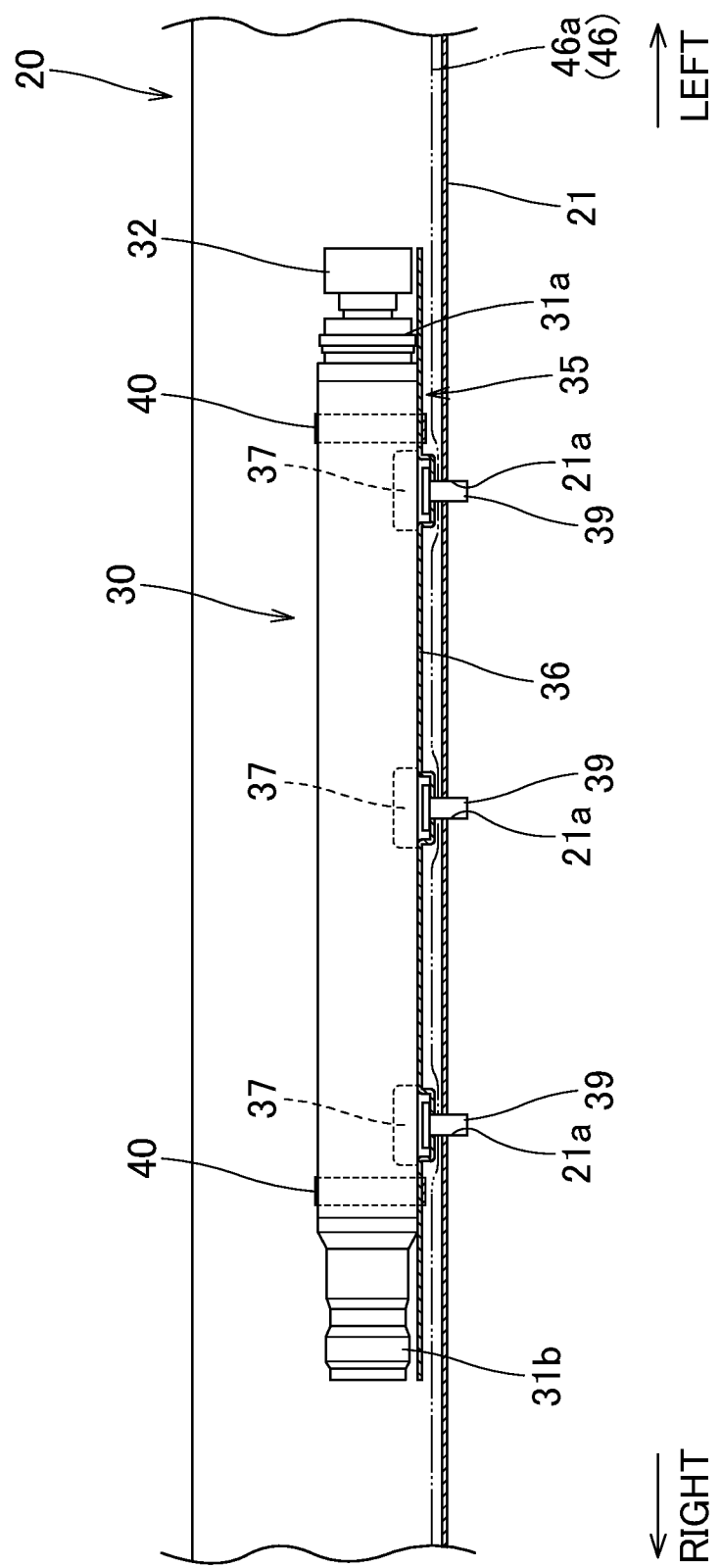
FIG. 4 is a schematic enlarged vertical sectional view of the airbag device of the exemplary embodiment taken along a left and right direction at the location of the inflator.

The inflator body 31 is generally cylindrical in outer contour, and is stored inside the airbag 45 such that the axial direction extends substantially along the left and right direction, as can be seen in FIGS. 2 and 4. The inflator body 31 is located substantially at the center in the left and right direction and in the front and rear direction of a later-described transverse inflatable portion of the airbag 45 inside the airbag 45, as indicated with dashed-and-double-dotted lines in FIGS. 5 and 6. As can be seen in FIG. 4, the inflator body 31 includes a gas releasing portion 32 for discharging an inflation gas at the first end (or left end) 31a in the axial direction. The second end (or right end) 31b in the axial direction of the inflator body 31 is electrically connected to an actuating circuit through a not-shown lead wire. The vehicle V on which the airbag device M is mounted is provided with a sensor (not shown) for sensing an impact against a pedestrian in the front bumper 6 (FIG. 1.) The actuating circuit is configured to actuate the inflator body 31 in response to a signal from the sensor which detected an impact between the vehicle V and a pedestrian.

The mounting bracket 35 that mounts the inflator body 31 on the case 20 includes a holding portion 36 that holds the inflator body 31, and a plurality (three, in the illustrated embodiment) mounting bolts 39 that protrude downwardly from the holding portion 36, as can be seen in FIGS. 2 and 4. The holding portion 36 is fabricated of sheet metal and formed into a band that extends substantially along the left and right direction (in other words, along the axial direction of the inflator body 31) to support the lower surface of the inflator body 31. The holding portion 36 is provided with one or more (three, in the illustrated embodiment) pairs of supporting tongues 37 that protrude to the front and rear from the holding portion 36 to support the inflator body 31. The three pairs of supporting tongues 37 are disposed spaced apart in the left and right direction. Each of the pairs of the supporting tongues 37 protrudes diagonally upward and outwardly in the front and rear direction from the front and rear edges of the holding portion 36 to support the outer circumference of the inflator body 31. Each of the pairs of the supporting tongues 37 is symmetrical in the front and rear direction, as can be seen in FIG. 2. In the illustrated embodiment, the supporting tongues 37 are formed at positions corresponding to the mounting bolts 39, as can be seen in FIG. 4. The mounting bolts 39 are located in a vicinity of the left end, in a vicinity of the right end, and in a vicinity of the center in the left and right direction, of the holding portion 36, in such a manner as to protrude downwardly. The mounting bracket 35 of the illustrated embodiment is fastened to the inflator body 31 by two clamps 40. As can be seen in FIG. 4, the two clamps 40 are disposed at a vicinity of each of the left and right ends of the inflator body 31.

The inflator 30, i.e. the inflator body 31 and mounting bracket 35 coupled together, is stored inside the airbag 45 such that the mounting bolts 39 protrude outwardly from later-described insertion holes 52 and mounting holes 56 whereas the inflator body 31 and the holding portion 36 of the mounting bracket 35 are stored inside the airbag 45, as can be seen in FIG. 2. The inflator 30 is mounted on the bottom wall 21 of the case 20 in that state (i.e. in a state where the inflator body 31 and the holding portion 36 of the mounting bracket 35 are stored inside the airbag 45). The inflator 30 is mounted on the case 20 together with the airbag 45 by nut 42 fastening the mounting bolts 39 that protrude from a later-described cover panel 54 and penetrate, the wrapping sheet 100, and the bottom wall 21 of the case 20. Although not depicted, an inner tube is disposed around the inflator body 31 and holding portion 36 of the mounting bracket 35.

Figure 5:
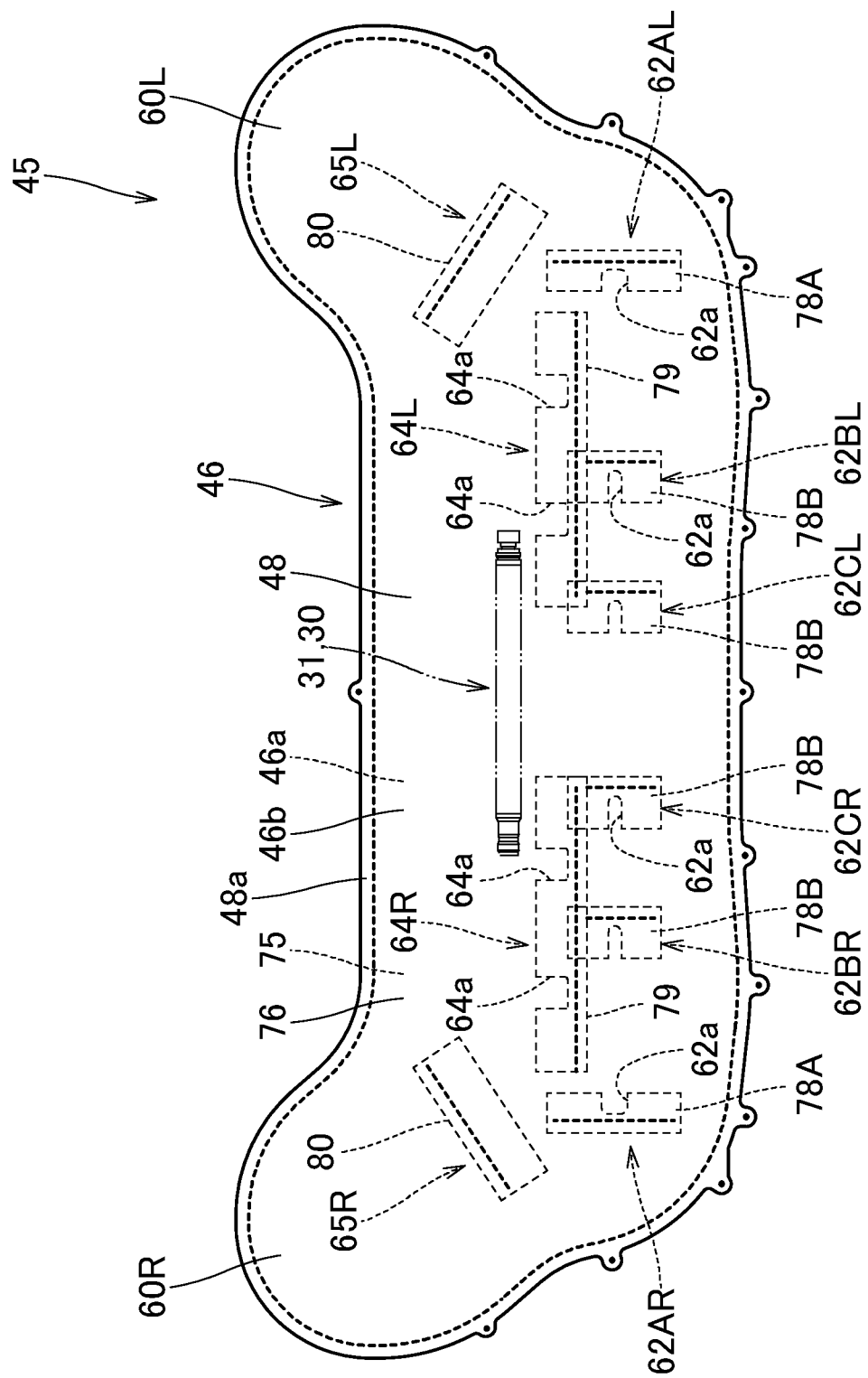
FIG. 5 is a plan view of an airbag for use in the airbag device of the exemplary embodiment as laid flat.
Figure 6:
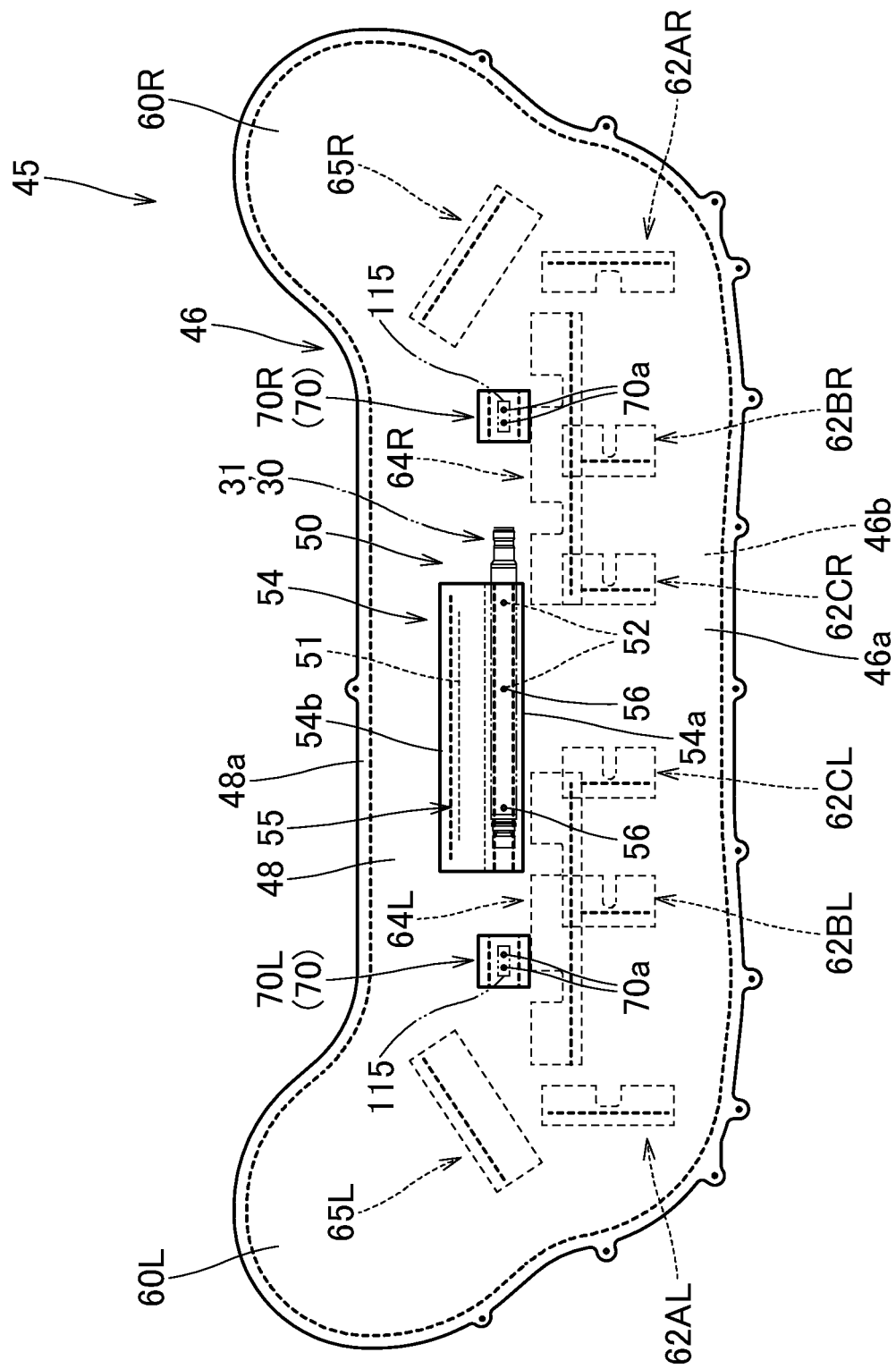
FIG. 6 is a bottom view of the airbag of FIG. 5.

Referring to FIGS. 5 and 6, the airbag 45 includes a bag body 46 which is inflatable with an inflation gas, and two mounting portions 70 which are used to mount a later-described vehicle-side wall 46a of the bag body 46 on the case 20.

The bag body 46 is designed to be inflated substantially into a U shape elongated in the left and right direction, as viewed from the front. The bag body 46 includes a transverse inflatable portion 48 that is configured to be deployed along the left and right direction, substantially along the lower portion 4a of the windshield 4, and two vertical inflatable portions 60L, 60R that are configured to extend rearward from opposite ends of the transverse inflatable portion 48 and cover the lower regions 5a of the left and right front pillars 5L and 5R. The bag body 46 includes a pedestrian-side wall 46b that is configured to be deployed on the upper side and a vehicle-side wall 46a that is configured to be deployed on the lower side facing the pedestrian-side wall 46b. The bag body 46 is formed by joining (sewing) entire outer circumferential edges of the pedestrian-side wall 46a and vehicle-side wall 46b together.

Figure 13:
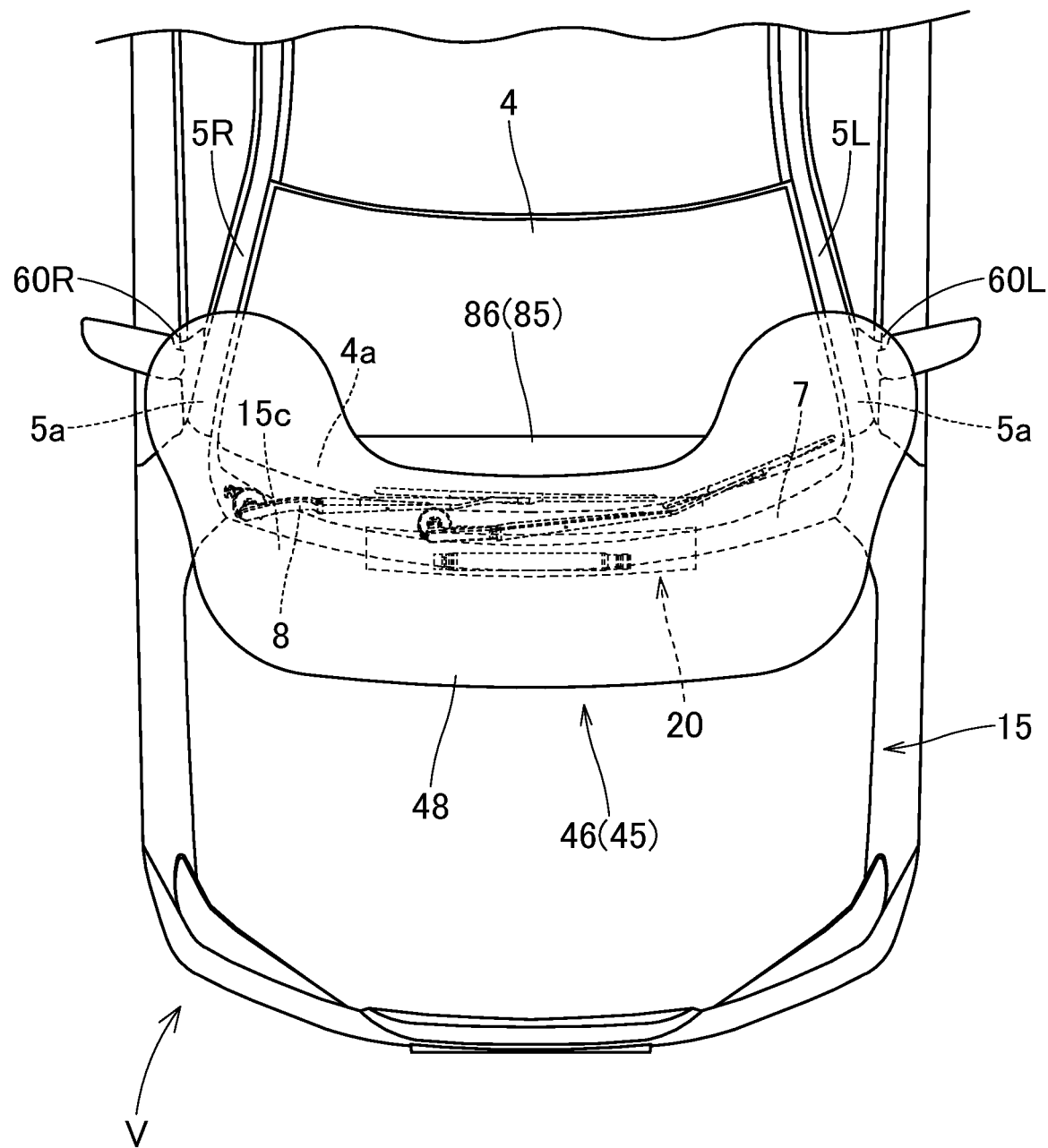
FIG. 13 is a schematic plan view of the airbag device of the exemplary embodiment as has deployed the airbag.

The transverse inflatable portion 48 of the illustrated embodiment is designed to be deployed over an upper or a front surface of an area from the rear end 15c portion of the hood 15 to the lower portion 4a of the windshield 4 via the cowl 7, including the wipers 8, as can be seen in FIGS. 13 and 14. The bag body 46 of the illustrated embodiment is provided with an insertion-opening section 50 for receiving the inflator 30 into the airbag 45 substantially at the center in the front and rear direction and in the left and right direction of the transverse inflatable portion 48 in the vehicle-side wall 46a, as shown in FIG. 6.

Figure 10:
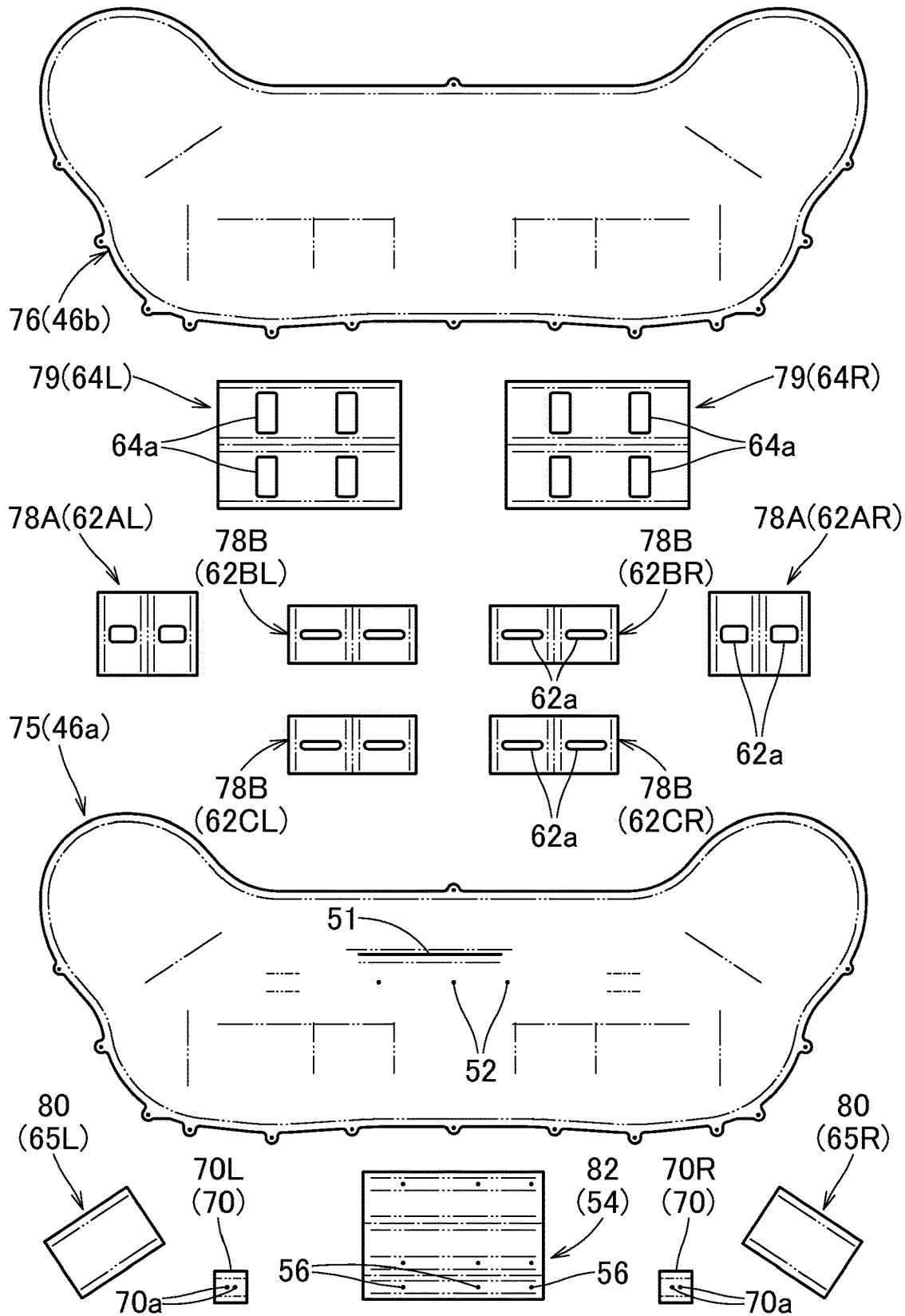
FIG. 10 depicts base members of the airbag of FIG. 5 by plan.

As can be seen in FIGS. 6 and 10, the insertion-opening section 50 includes a slit 51 and a plurality of insertion holes 52 for receiving the mounting bolts 39 of the inflator 30, which are formed on the vehicle-side wall 46a, and a cover panel 54 that covers the slit 51 from the outside. The slit 51 is to receive the inflator 30, and has a straight shape extending substantially along the left and right direction, along the axial direction of the inflator body 31. As can be seen in FIG. 6, the length of the slit 51 is shorter than the length of the inflator body 31. The insertion holes 52 are formed at three positions spaced apart in the left and right direction, corresponding to the mounting bolts 39. In the illustrated embodiment, the insertion holes 52 are formed in front of the slit 51 in the bag body 46 as laid flat. The cover panel 54 is formed of a sheet material having flexibility prepared separately from the bag body 46. The cover panel 54 has a substantially rectangular outer shape elongated in the left and right direction so as to cover the slit 51 on the outside of the vehicle-side wall 46a. The rear end 54b of the cover panel 54 is joined to the vehicle-side wall 46a with a joint 55 at the rear of the slit 51. The joint 55 continuously joins the rear end 54b of the cover panel 54 to the vehicle-side wall 46a over an entire length in the left and right direction of the cover panel 54. The front end 54a region of the cover panel 54 is provided with a plurality of mounting holes 56 for receiving the mounting bolts 39 corresponding to the insertion holes 52. The cover panel 54 of the illustrated embodiment is formed of a base cloth 82 depicted in FIG. 10.

Referring to FIGS. 5, 6 and 14, the bag body 46 internally includes a plurality of tethers that respectively connect the pedestrian-side wall 46b and vehicle-side wall 46a together for limiting a distance between the pedestrian-side wall 46b and vehicle-side wall 46a at airbag deployment; six front-rear tethers 62AL, 62BL, 62CL, 62AR, 62BR, 62CR, two left-right tethers 64L, 64R, and two edge-side tethers 65L, 65R. Each of the left-right tethers 64L, 64R is arranged substantially along the left and right direction at a position slightly farther forward than the center in the front and rear direction of the transverse inflatable portion 48. Each of the front-rear tethers 62AL, 62AR is arranged substantially along the front and rear direction at a position farther outward in the left and right direction than the left-right tether 64L/64R. The front-rear tethers 62BL, 62BR, 62CL, 62CR are arranged substantially along the front and rear direction in front of the left-right tethers 64L, 64R. The front-rear tethers 62AL, 62BL, 62CL, 62AR, 62BR, 62CR are disposed side by side in the left and right direction. Each of the front-rear tethers 62AL, 62AR is greater in length than the front-rear tethers 62BL, 62BR, 62CL, 62CR and extends farther rearward than the left-right tethers 64L, 64R. As can be seen in FIGS. 5, 6, 10 and 14, in the illustrated embodiment, each of the left-right tethers 64L, 64R and each of the front-rear tethers 62AL, 62BL, 62CL, 62AR, 62BR, 62CR is provided with one or more openings 64a/62a that allows passage of an inflation gas. More particularly, each of the front-rear tethers 62AL, 62BL, 62CL, 62AR, 62BR, 62CR includes one opening 62a formed into an elongate hole elongated in the up and down direction. Each of the left-right tethers 64L, 64R includes two openings 64a each formed into an elongate hole elongated in the up and down direction. Each of the edge-side tethers 65L, 65R is arranged at a slant with respect to the left and right direction so that the inner portion in the left and right direction is located farther rearward than the outer portion, at a vicinity of the border between the transverse inflatable portion 48 and vertical inflatable portion 60L/60R. These front-rear tethers 62AL, 62BL, 62CL, 62AR, 62BR, 62CR, the left-right tethers 64L, 64R and the edge-side tethers 65L, 65R are arranged bilaterally symmetrically inside the bag body 46.

Each of the mounting portions 70 (70L, 70R) that are used to mount the vehicle-side wall 46a of the bag body 46 on the case 20 is formed of a sheet material having flexibility prepared separately from the bag body 46. As can be seen in FIG. 6, each of the mounting portions 70 is joined (sewn) to the vehicle-side wall 46a by the front and rear ends. In the illustrated embodiment, one each mounting portion 70 (70L, 70R) is disposed between the insertion-opening section 50 and the edge-side tether 65/65R, at the rear of the left-right tether 64L/64R, in the bag body 64 as laid flat, so that the two mounting portions 70 form bilateral symmetry. These mounting portions 70 (70L, 70R) are mounted on the bottom wall 21 of the case 20 through the use of the mounting brackets 115. As described later, a mounting plate 116 of each of the mounting brackets 115 is inserted between each of the mounting portions 70 (70L, 70R) and the vehicle-side wall 46a as shown in FIG. 3. Each of the mounting portions 70 (70L, 70R) is provided with two through holes 70a for receiving later-described mounting bolts 117 of the mounting bracket 115.

Referring to FIG. 10, the airbag 45 of the illustrated embodiment is composed of a vehicle-side base cloth 75 for forming the vehicle-side wall 46a of the bag body 46, a pedestrian-side base cloth 76 for forming the pedestrian-side wall 46b of the bag body 46, ten base cloths 78A, 78B, 79, 80 for forming the front-rear tethers 62AL, 62BL, 62CL, 62AR, 62BR, 62CR, the left-right tethers 64L, 64R and the edge-side tethers 65L, 65R, a bases cloth 82 for forming the cover panel 54, and mounting portions 70. Each of these base cloths (or base members) is formed of a woven fabric that is woven with polyamide yarn, polyester yarn or the like and coated with a suitable coating agent for preventing gas leakage. The fabric is cut into predetermined shapes to form these base cloths.

Figure 7:
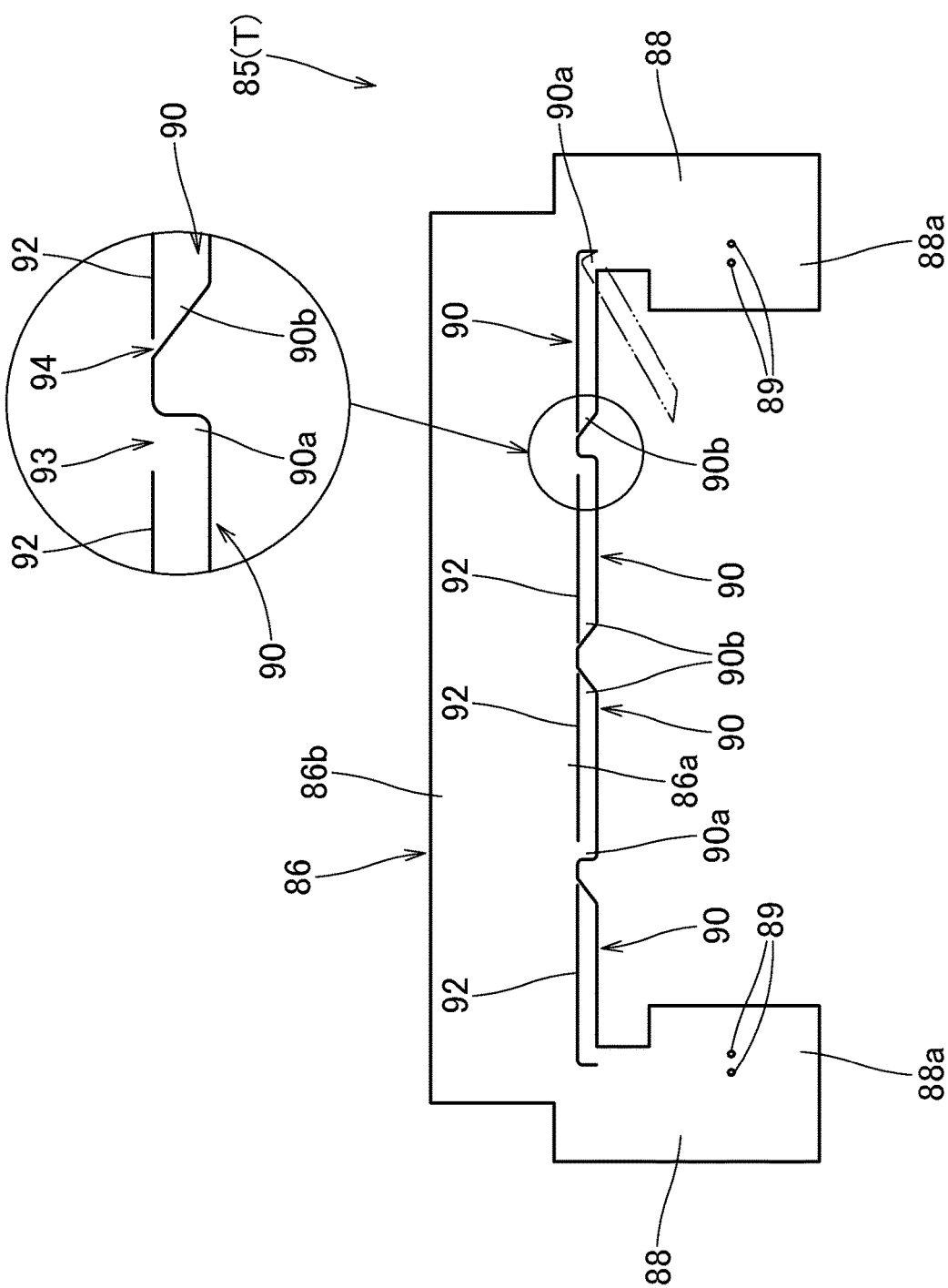
FIG. 7 is a plan view of a protecting sheet for use in the airbag device of the exemplary embodiment as laid flat.

The protecting sheet 85 that is folded together with the airbag 45 and stored in the case 20 is formed of a sheet material having flexibility. The protecting sheet 85 of the illustrated embodiment is formed of a woven fabric that is woven with polyamide yarn, polyester yarn or the like and coated with a suitable coating agent for preventing gas leakage, similarly to the base members of the airbag 45. As can be seen in FIG. 7, the protecting sheet 85 includes a main body 86, two connecting wings (as connecting portions) 88 that extend forward from left and right end portions of the main body 86 as laid flat, and a plurality of straps 90 that are formed in a vicinity of the front edge 86a of the main body 86.

Figure 8:
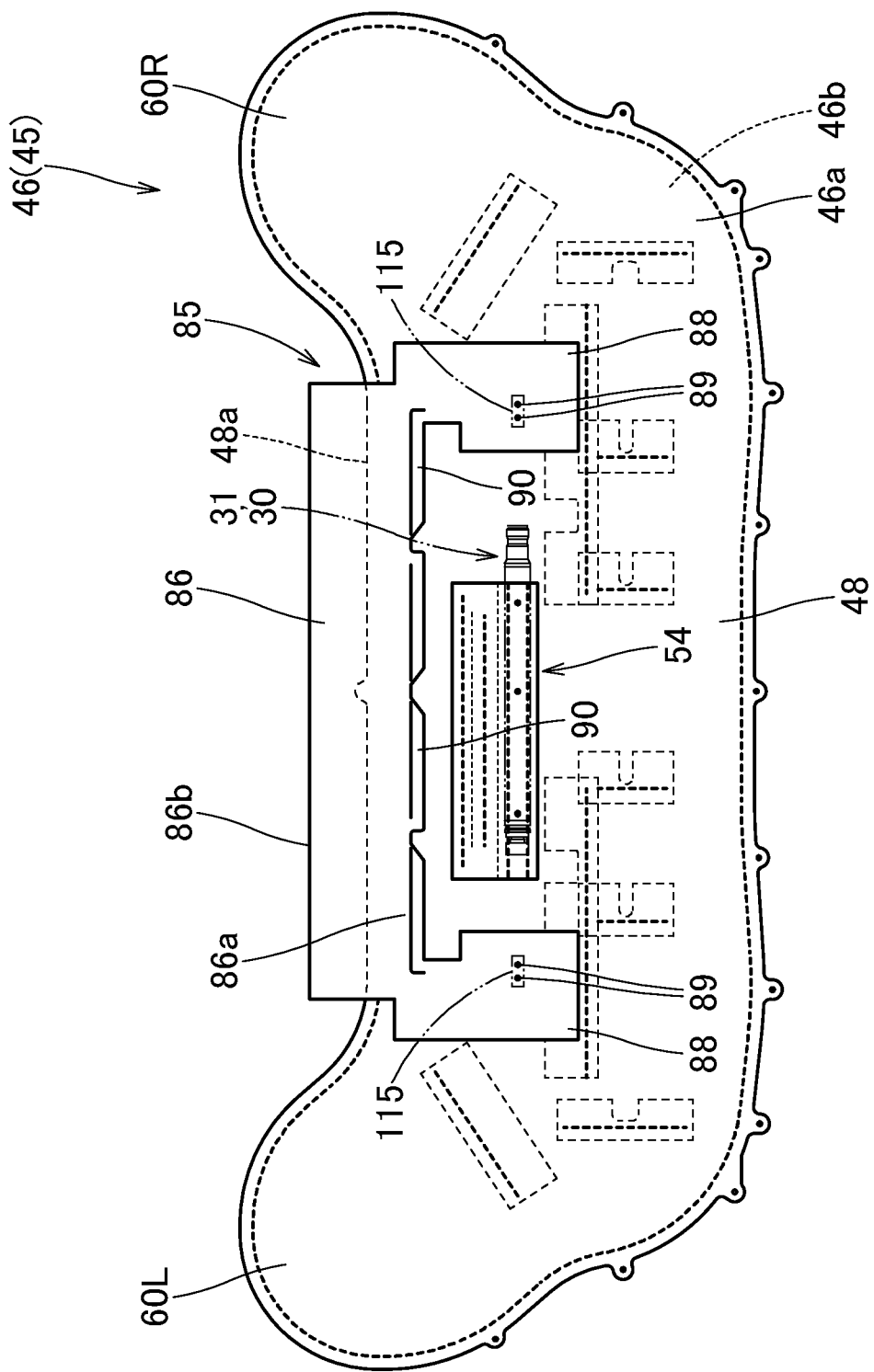
FIG. 8 is a bottom view of the airbag of FIG. 5 and the protecting sheet of FIG. 7 as laid over the airbag.
Figure 11:
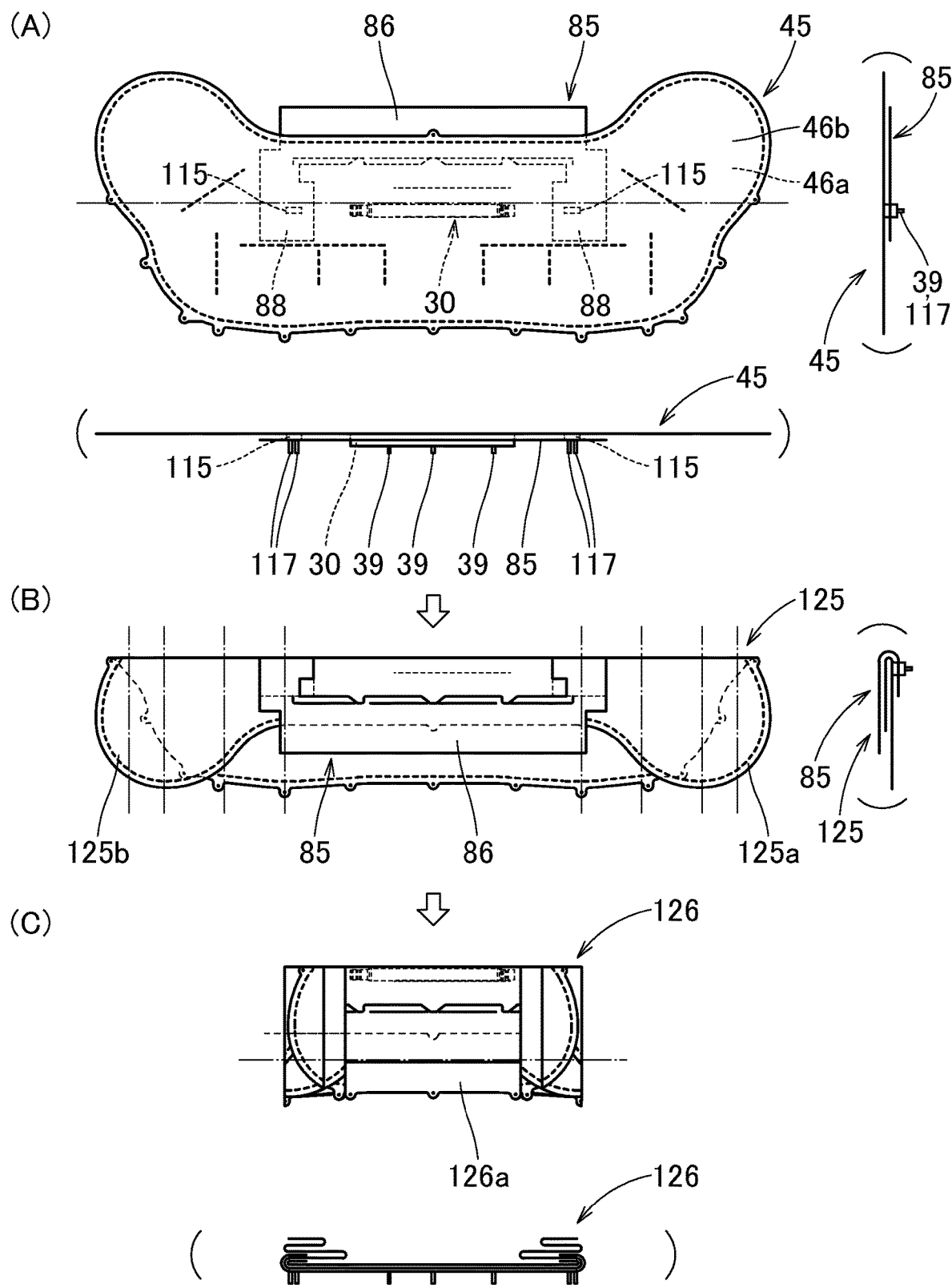
FIG. 11 schematically illustrates a folding process of the airbag that folds the airbag together with the protecting sheet.

The main body 86 is designed to protrude from the case 20 and cover the underside of the bag body 46 (airbag 45) at airbag deployment, as can be seen in FIGS. 13 and 14. The main body 86 has a substantially rectangular outer shape elongated in the left and right direction. More specifically, the main body 86 has a size that is able to cover the rear edge 48a portion of the transverse inflatable portion 48 of the bag body 46 (in other words, a portion of the transverse inflatable portion 48 between the vertical inflatable portions 60L, 60) as shown in FIG. 8 in a state where the main body 86 is laid over the airbag 45 as laid flat so that later-described mounting holes 89 formed in the connecting wings 88 match the through holes 70a of the mounting portions 70 in position. More particularly, the width in the left and right direction of the main body 86 is slightly smaller than the width in the left and right direction of the rear edge 48a portion of the transverse inflatable portion 48, and the width in the front and rear direction of the main body 86 is approximately one fifth of the width in the left and right direction. As shown in FIG. 8, the main body 86 is laid over the airbag 45 such that the rear edge 86b is located farther rearward than the rear edge 48a of the transverse inflatable portion 48 and the front edge 86a is located farther forward than the rear edge 48a of the transverse inflatable portion 48. Further, the width in the left and right direction of the main body 86 is substantially the same as that of the later-described folded-up body 127 (see (B) and (C) of FIG. 11, (C) and (D) of FIG. 12), that is, substantially the same as the width in the left and right direction of the case 20. As can be seen in FIGS. 13 and 14, the protecting sheet 85 is designed so that the main body 86 extends farther rearward than the transverse inflatable portion 48 at airbag deployment so as to prevent the airbag 45 from interfering with the wipers 8 which protrude partially upward from the cowl louver 7b.

The connecting wings 88 as the connecting portions extend forward from the left and right end portions of the main body 86. More specifically, each of the connecting wings 88 is formed substantially into a band that extends forward from the main body 86 while protruding outwardly in the left and right direction, as can be seen in FIG. 7. The connecting wings 88 are located at positions corresponding to the mounting portions 70 of the airbag 45, and each include, in a vicinity of the front end 88a (at a position slightly forward of the center in the front and rear direction of the connecting wing 88), two mounting holes 89 for receiving mounting bolts 117 of the later-described mounting bracket 115. That is, the protecting sheet 85 is mounted on the case 20 (bottom wall 21) together with the mounting portions 70 of the airbag 45 by the front end 88a portions of the connecting wings 88 (by the front end portions as laid flat), with the use of the mounting brackets 115, as can be seen in FIG. 3.

The straps 90 are provided at a plurality of (four, in the illustrated embodiment) locations in the left and right direction of the front edge 86a of the main body 86. Each of the straps 90 is formed by forming a continuous slit 92 in a vicinity of the front edge 86a of the main body 86 as laid flat. Each of the straps 90 is disposed in front of the main body 86 substantially in a band shape extending in the left and right direction with the slit 92 interposed while being connected with the main body 86 by the opposite ends in the base portion 90a and leading-end portion 90b. More specifically, each of the straps 90 is connected to the main body 86 by the opposite ends in such a manner that the leading-end portion 90b is disconnectable from the main body 86 while the base portion 90a stays connected to the main body 86. Even more particularly, the leading-end portion 90b of each of the straps 90 has a tapered shape tapering toward the terminal, and a leading-end connecting portion 94 that connects the leading-end portion 90b to the main body 86 has a smaller width than that of a base-side connecting portion 93 that connects the base portion 90a to the main body 86. Thus the leading-end portion 90b of each of the straps 90 is configured disconnectable from the main body 86 while the base portion 90a stays connected. In the illustrated embodiment, the four straps 90 are arranged symmetrically with respect to the center in the left and right direction of the main body 86 with the leading ends 90b pointing toward the center in the left and right direction of the main body 86, as shown in FIG. 7. In the illustrated embodiment, the four straps 40 are arranged in a substantially entire area in the left and right direction of the front edge 86a of the main body 86 with little gap in between. The leading-end portion 90b of each of the straps 90 is connected to the main body 86 when the airbag device M is mounted on the vehicle V. Each of the straps 90 is designed such that, after airbag deployment, the leading-end portion 90b (the leading-end connecting portion 94) is disconnected from the main body 86 so as to be passed through a later-described through hole 110 of the wrapping sheet 100.

Figure 9:
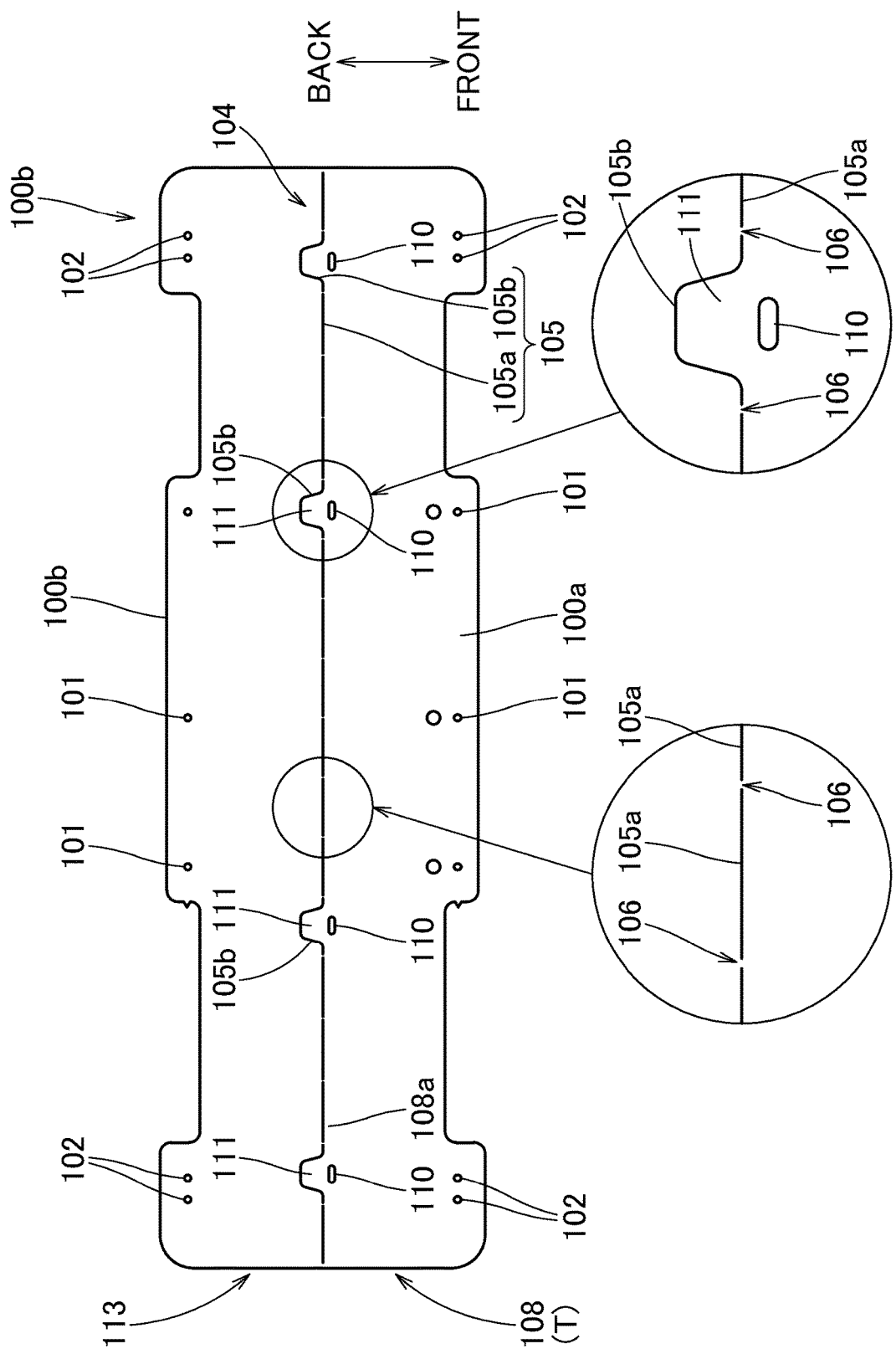
FIG. 9 is a plan view of a wrapping sheet for use in the airbag device of the exemplary embodiment as laid flat.

The wrapping sheet 100 that wraps the airbag 45 as folded up (i.e. the folded-up body 127) is formed of a sheet material having flexibility. The wrapping sheet 100 of the illustrated embodiment is formed of a woven fabric that is woven with polyamide yarn, polyester yarn or the like and coated with a suitable coating agent for preventing gas leakage, similarly to the base members of the airbag 45 and the protecting sheet 85. As can be seen in FIG. 9, the wrapping sheet 100 as laid flat has a substantially rectangular outer shape elongated in the left and right direction. The wrapping sheet 100 includes, in opposite edges 100a, 100b in the width direction, a plurality each of through holes 101, 102 for receiving the mounting bolts 39 of the inflator 30 and the mounting bolts 117 of the mounting brackets 115, respectively. The wrapping sheet 100 is mounted around the folded-up body 127 with the mounting bolts 39 and 117, which protrude from the folded-up body 127, passed through the through holes 101, 102, thereby keeps the folded-up configuration of the folded-up body 127, as can be seen in FIGS. 2, 3 and (D) of FIG. 12. The dimension in length direction (i.e. in the left and right direction) of the wrapping sheet 100 is substantially the same as that of the folded-up body 127, and the dimension in width direction of the wrapping sheet 100 is such as to be able to wrap the folded-up body 127 as slightly compacted without leaving any gap. The wrapping sheet 100 is provided, in the center in the width direction, a rupturable portion 104 that is composed of intermittent slits 105 each of which extends substantially along the length direction (in other words, along an axial direction of the inflator 30, or along the left and right direction of the airbag device M as mounted on board). Further, a plurality of (four, in the illustrated embodiment) through holes 110 each for receiving corresponding one of the straps 90 of the protecting sheet 85 are formed at locations spaced-apart in the left and right direction, on a front side of the rupturable portion 104. Each of the through holes 110 has a substantially oval shape elongated substantially in the left and right direction. The slits 105 constituting the rupturable portion 104 include a plurality of general slits 105a each of which extends straightly substantially along the left and right direction and a plurality of (four, in the illustrated embodiment) tab-forming slits 105b each of which is formed to protrude partially from the general slits 105 at the rear of the through hole 110. Each of the tab-forming slits 105b is designed to form a tab 111 which has a trapezoidal shape slightly narrowing toward the leading end, at rupture of the rupturable portion 104. When the wrapping sheet 100 is mounted around the folded-up body 127, the rupturable portion 104 is designed to be located substantially at the center in the front and rear direction of an upper surface of the folded-up body 127, as can be seen in (D) of FIG. 12. The rupturable portion 104 is designed to rupture at airbag deployment so that the wrapping sheet 100 is split into two in the front and rear (into a front portion 108 and a rear portion 113) over an entire area in the left and right direction due to breaking of bridging portions 106 between the slits 105 (between two general slits 105a or between a general slit 105a and a tab-forming slit 105b).

Figure 15:
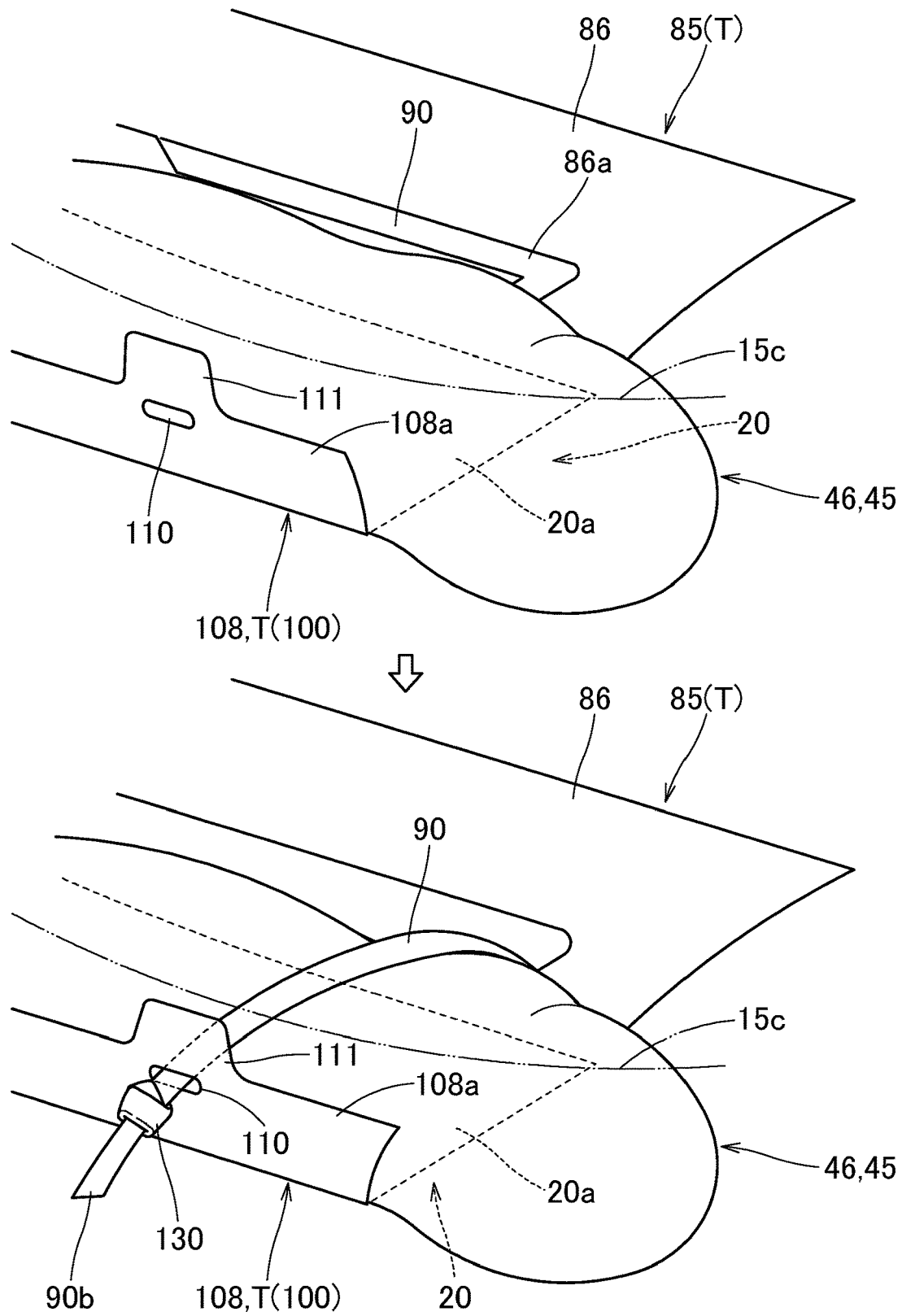
FIG. 15 illustrates the way the airbag having deployed is shrank and tied toward the storage with a shrinking and tying means by schematic partial enlarged perspective views, in the airbag device in accordance with the exemplary embodiment.

The airbag device M in accordance with the exemplary embodiment includes means T for shrinking and tying the airbag 45 which has deployed toward the case (i.e. storage) 20, namely, shrinking and tying means T. The shrinking and tying means T is composed of the front portion 108 of the wrapping sheet 100 formed after rupture of the rupturable portion 104, and the protecting sheet 85. More specifically, in the airbag device M in accordance with the exemplary embodiment, the airbag 45 having deployed is designed to be able to be reduced in size and gathered toward the case 20 as can be seen in FIGS. 15 and 16 by deflating the airbag 45, gathering the airbag 45 toward the case 20, passing the leading-end 90b portion of each of the straps 90, which has been disconnected from the main body 86 of the protecting sheet 85, through the through hole 110 disposed in a vicinity of the edge 108a of the front portion 108 of the wrapping sheet 100 located in a vicinity of the emergence opening 20a of the case 20, and tying the leading-end 90b portion of each of the straps 90 so as to prevent disengagement of the strap 90 from the through hole 110 (in the illustrated embodiment, a knot 130 is formed in the leading-end 90b portion of each of the straps 90 at a side toward the leading end with respect to the through hole 110). The dimension (the dimension in the front and rear direction) of the front portion 108 of the wrapping sheet 100 as laid flat, the length of each of the straps 90 of the protecting sheet 85, and the length (the dimension in the front and rear direction) of each of the connecting wings 88 of the protecting sheet 85 as laid flat are set so as to enable each of the straps 90 to be passed through the through hole 110 and form a knot 130 in the periphery of the through hole 110 and so as to be able to compact the airbag 45 toward the case 20.

Each of the mounting brackets 115 which mount the mounting portions 70 of the airbag 45 on the bottom wall 21 of the case 20 includes a mounting plate 116 (FIG. 3) formed substantially into a rectangular plate, and two mounting bolts 117 protruding downward from the mounting plate 116. As indicated with dashed-and-double-dotted lines in FIG. 6, each of the mounting plates 116 is formed into a substantially rectangular plate elongated in the left and right direction. The mounting bolts 117 are arranged in the left and right direction though not depicted in detail. Each of the mounting brackets 115 mounts the mounting piece 70 on the bottom wall 21 of the case 20 with the mounting bolts 117 passed through the mounting piece 70, the mounting holes 89 formed in the connecting wing 88 of the protecting sheet 85, the through holes 102 formed in the wrapping sheet 100 and the bottom wall 21 of the case, then fastened with nuts 119. That is, the connecting wings 88 of the protecting sheet 85 are also mounted on the bottom wall 21 of the case 20, as can be seen in FIG. 3.

Mounting of the airbag device M on the vehicle V is now described. In advance of the mounting, the inflator body 31 is coupled with the mounting bracket 35 with the use of the clamps 40 to form the inflator 30, and the inflator 30 in that state is inserted into the airbag 45 via the slit 51. The inflator 30 is then set so that the mounting bolts 39 of the mounting bracket 35 protrude from the insertion holes 52 and the mounting holes 56 of the cover panel 54. The mounting brackets 115 are also attached to the mounting portions 70 so that the mounting bolts 117 protrude from the through holes 70a. Then firstly, the airbag 45 is folded up for storage in the case 20. To describe it in detail, the airbag 45 is laid flat with the vehicle-side wall 46a and the pedestrian-side wall 46b laid over one another, and the protecting sheet 85 in a flattened state is laid over the vehicle-side wall 46a of the airbag 45 so that the mounting bolts 117 go through the mounting holes 89, as shown in (A) of FIG. 11. Then the airbag 45 is doubled toward the pedestrian-side wall 46b together with the protecting sheet 85 so that the width in the front and rear direction of the airbag 45 is reduced, as shown in (B) of FIG. 11. This provides an initial folded bag 125. Subsequently, the left end 125a portion and the right end 125b portion of the initial folded bag 125 are folded toward the center in the left and right direction in a concertina fashion on the pedestrian-side wall 46b, as shown in (B) and (C) of FIG. 11. This provides a left-right contracted bag 126 with a width in the left and right direction stowable in the case 20. Subsequently, the left-right contracted bag 126 is rolled on the pedestrian-side wall 46b from the front edge 126a as shown in (A) and (B) of FIG. 12, thereby providing the folded-up body 127 (see (B) of FIG. 12.) Thereafter, the wrapping sheet 100 is mounted around the folded-up body 127 so that the mounting bolts 39 and 117 protrude from the through holes 101 and 102, respectively, as shown in (C) and (D) of FIG. 12.

Thereafter, the folded-up body 127 is stored in the case 20 so that the mounting bolts 39 and 117 protrude from the bottom wall 21, then the mounting bolts 39 and 117 are fastened with nuts 42 and 119. Thus, the airbag 45 and inflator 30 are mounted on the case 20, and the protecting sheet 85 is also mounted on the case 20 by the front end portion (i.e. by the connecting wings 88). Then if the airbag cover 25 is mounted on the case 20, the not-shown bracket extending from the case 20 is mounted on the cowl panel 7a and the inflator body 31 is connected to the not-shown actuating circuit, mounting of the airbag device M on the vehicle V is completed.

With the airbag device M for pedestrian protection of the exemplary embodiment, when the not-shown actuating circuit detects an impact against a pedestrian based on a signal fed from the sensor mounted on the front bumper 6, the inflator 30 will be actuated and inflate the airbag 45, and the airbag 45 will tear the rupturable portion 104 of the wrapping sheet 100 so the wrapping sheet 100 is torn into the front portion 108 and rear portion 113, and push and open the door 26 of the airbag cover 25 and emerge from the emergence opening 20a of the case 20 formed by opening of the door 26, then deploy upward. The airbag 45 will then be deployed over the upper surface of the rear end 15c portion of the hood 15, the upper surface of the cowl 7 and the front surfaces of the lower portions 5a of the front pillars 5L and 5R, as shown in FIGS. 13 and 14.

In the airbag device M for pedestrian protection in accordance with the exemplary embodiment, the protecting sheet 85 that has been folded together with the airbag 45 and stored in the case (i.e. storage) 20 and the front portion 108 of the wrapping sheet 100 that is located on a front side after rupture of the rupturable portion 104 constitute the means T for shrinking and tying the airbag 45 after deployment toward the case (i.e. storage) 20. The shrinking and tying means T will help shrink and gather the airbag 45 toward the case 20 by deflating and shrinking the deployed airbag 45 toward the case 20, passing each of the straps 90 which extend from the circumferential edge (from the front edge 86a, in the illustrated embodiment) of the main body 86 of the protecting sheet 85 through the through hole 110 disposed in a vicinity of the edge 108a of the front portion 108 of the wrapping sheet 100, and tying the leading-end 90b portion of each of the straps 90 so as to prevent the strap 90 from being disengaged from the through hole 110 (in the illustrated embodiment, a knot 130 is formed in the leading-end 90b portion of each of the straps 90 at a side toward the leading end with respect to the through hole 110), as can be seen in FIGS. 15 and 16. That is, in the airbag device M in accordance with the exemplary embodiment, the means T for shrinking and tying the deployed airbag 45 toward the case 20 is comprised of the protecting sheet 85 and wrapping sheet 100 that are prepared separate from the airbag 45 and disposed on the outer surface of the airbag 45. This shrinking and tying means T is easy to use and does not hinder airbag deployment. Moreover, since the wrapping sheet 100 wraps the folded-up body 127 to keep the folded-up configuration of the airbag 45 and is stored in the case 20 together with the folded-up body 127, the edge 108a of the front portion 108 of the wrapping sheet 100 after rupture of the rupturable portion 104 is located in a vicinity of the emergence opening 20a of the case 20 for allowing airbag emergence. In other words, since the straps 90 of the illustrated embodiment extend only from the circumferential edge (front edge 86a) of the main body 86 of the protecting sheet 85 and since these straps 90 are each configured to be passed through the through holes 110 disposed in the edge 108a of the wrapping sheet 100 located in the vicinity of the emergence opening 20a of the case 20 and tied or knotted in a vicinity of the through holes 110, in order to pass each of the straps 90 through the through hole 100 and tie it in the vicinity of the through hole 110 smoothly, the airbag 45 will have to be deflated and compacted as much as possible toward the case 20 in such a manner as to be pushed into the case 20 partially. Accordingly, the shrinking and tying means T will help shrink and gather the airbag 45 toward the case 20 compactly, and the airbag 45 as gathered toward the case 20 will provide a sufficient eyesight to the driver who needs to drive the vehicle after airbag deployment.

Therefore, the airbag device M for pedestrian protection in accordance with the exemplary embodiment will enable the airbag 45 after deployment to be shrank and gathered toward the case 20 compactly.

In the airbag device M in accordance with the exemplary embodiment, each of the straps 90 is arranged substantially along the circumferential edge (along the front edge 86a) of the main body 86 of the protecting sheet 85 with the leading-end portion 90b and base portion 90a joined to the main body 86 due to the continuous slit 92 formed in a vicinity of the circumferential edge (the front edge 86a) of the main body 86. The leading-end portion 90b is configured to be disconnectable from the main body 86 while the base portion 91a stays joined to the main body 86. This configuration will facilitate handling of the straps 90 since the straps 90 may be handled integrally with the protecting sheet 85 in the folding process of the protecting sheet 85 and the airbag 45.

In the airbag device M in accordance with the exemplary embodiment, moreover, the protecting sheet 85 includes the main body 86 that is configured to extend rearward from the case 20 at airbag deployment, and two connecting wings (i.e. connecting portions) 88 that extend forward from left and right end portions of the main body 86 as unfolded and are mounted on the case 20. The straps 90 are located in the front edge 86a of the main body 86 as unfolded. In comparison with an instance where the straps are located in a rear region of the main body 86, this configuration will shorten a substantial distance between the through holes 110 formed in the wrapping sheet 100 and the straps 90 by the length of the main body 86, in other words, shorten a circumferential length of a portion of the shrinking and tying means T directly disposed around the airbag 45 or directly tying the airbag 45, because the portion does not include the main body 86. That is, since the airbag 45 is tied by the straps 90 and the front portion 108 of the wrapping sheet 100 only, the airbag 45 will be further reduced in size. If such an advantageous effect does not have to be considered, the straps may be disposed in the rear portion of the protecting sheet.

In the airbag device M in accordance with the exemplary embodiment, furthermore, the rupturable portion 104 of the wrapping sheet 100 is formed so that a tab 111 which protrudes partially from surroundings is formed around each of the through holes 110 at rupture of the rupturable portion 104. The tabs 110 will facilitate the work of passing the straps through the through holes 110 since the tabs 111 protrude partially from the edge 108a of the front portion 108 of the wrapping sheet 100, thus are easy to find visually and easy to pull by hand. If such an advantageous effect does not have to be considered, the rupturable portion does not have to be configured so that the tabs are formed around the through holes.

To describe how to shrink and gather the airbag 45 after deployment toward the case 20 in detail, the vertical inflatable portions 60L, 60R of the deployed airbag 45 are firstly deflated and shrank forward, then folded toward the center in the left and right direction of the horizontal inflatable portion 48, then the horizontal inflatable portion 48 is also deflated and shrank in the front and rear direction and pulled toward the case 20, though not depicted in detail. Thereafter, the airbag 45 is further deflated and compacted in such a manner as to be pushed into the case 20, then the straps 90 which extend from the front edge 86a of the main body 86 of the protecting sheet 85 are respectively passed through the corresponding through holes 100 disposed in the edge 108a of the front portion 108 of the wrapping sheet 108, and tied to form one each knot 130 at a side toward the leading end with respect to the through holes 110. This way the airbag 45 after deployment is shrank and gathered toward the case 20 as much as possible, as can be seen in FIGS. 15 and 16. In the airbag device M in accordance with the exemplary embodiment, the width in the left and right direction of the main body 86 of the protecting sheet 85 is substantially the same as that of the case 20, and the straps 90 disposed in the front edge 86a of the main body 86 of the protecting sheet 85 and the through holes 110 for receiving the straps 90 are each located at four locations in the left and right direction. Thus the airbag 45 is shrank and gathered toward the case 20 steadily with the straps 90 and the through holes 110 in a wide area extending over an entire area in the left and right direction of the case 20. In the foregoing embodiment, each of the straps 90 as passed through the through hole 110 is tied to form a knot 130 at a side toward the leading end with respect to the through hole 110 in order to prevent disengagement of the strap 90 from the through hole 110. However, the way of tying the straps should not be limited to those in the present disclosure. By way of example, the leading-end portion of each of the straps as passed through the through hole may be tied to the tab.

The exemplary embodiment of the present disclosure relates to an airbag device for pedestrian protection adapted to be mounted on a vehicle, the airbag device includes:

a storage that is adapted to be mounted on a vicinity of a rear end of a hood of the vehicle;

an airbag that is stored in the storage in a folded-up configuration, the airbag being configured to be inflated and deployed over a front surface of at least a lower portion of a windshield of the vehicle;

a protecting sheet that is formed of a sheet material having flexibility and has been folded together with the airbag and stored in the storage, the protecting sheet being joined to the storage by a front end thereof, the protecting sheet including a main body that is configured to unfold and extend rearward from the storage at airbag deployment to cover an underside of the airbag as deployed, and a plurality of straps that are disposed side by side in a left and right direction of the main body in a circumferential edge of the main body, wherein each of the plurality of straps is arranged substantially along the circumferential edge of the main body with a leading-end portion and a base portion thereof joined to the main body due to a continuous slit formed in a vicinity of the circumferential edge of the main body, and wherein the leading-end portion is configured to be disconnectable from the main body while the base portion is configured to stay joined to the main body; and a wrapping sheet that is formed of a sheet material having flexibility and wraps the airbag in order to keep the folded-up configuration of the airbag, the wrapping sheet including a rupturable portion that includes a plurality of intermittent slits extending substantially in a left and right direction of the wrapping sheet and is configured to rupture at airbag deployment to split an entirety of a portion of the wrapping sheet covering an upper surface of the airbag into a front portion and a rear portion, the wrapping sheet further including, in a vicinity of the rupturable portion in the front portion, a plurality of through holes each for receiving corresponding one of the plurality of straps, whereby at least the front portion of the wrapping sheet and the protecting sheet constitute means for shrinking and tying the airbag after deployment toward the storage by passing each of the plurality of straps with the leading-end portion disconnected from the main body of the protecting sheet through each of the through holes of the wrapping sheet and tying the leading-end portion of each of the straps so as to prevent disengagement of the strap from the through hole.

In the airbag device for pedestrian protection in accordance with the exemplary embodiment, the protecting sheet that has been folded together with the airbag and stored in the storage and the front portion of the wrapping sheet that is located on a front side after rupture of the rupturable portion constitute means for shrinking and tying the airbag after deployment toward the storage. The means for shrinking and tying will help shrink and gather the airbag toward the storage by deflating and shrinking the deployed airbag toward the storage, passing each of the straps which extend from the circumferential edge of the main body of the protecting sheet through the through hole disposed in a vicinity of an edge of the front portion of the wrapping sheet, and tying the leading-end portion of each of the straps so as to prevent disengagement of the strap from the through hole. That is, in the airbag device for pedestrian protection in accordance with the exemplary embodiment, the means for shrinking and tying the deployed airbag toward the storage is comprised of the protecting sheet and wrapping sheet that are prepared separate from the airbag and disposed on the outer surface of the airbag. This means for shrinking and tying is easy to use and does not hinder airbag deployment. Moreover, since the wrapping sheet wraps the airbag to keep the folded-up configuration of the airbag and is stored in the storage together with the airbag, the edge of the front portion of the wrapping sheet after rupture of the rupturable portion is located in a vicinity of an emergence opening of the storage for allowing airbag emergence. In other words, since the plurality of straps extend only from the circumferential edge of the main body of the protecting sheet and since the plurality of straps are each configured to be passed through the through holes disposed in the edge of the wrapping sheet located in the vicinity of the emergence opening of the storage and tied or knotted in a vicinity of the through holes, in order to pass each of the straps through the through hole and tie it in the vicinity of the through hole smoothly, the airbag will have to be deflated and compacted as much as possible toward the storage in such a manner as to be pushed into the storage partially. Accordingly, the means for shrinking and tying will help shrink and gather the airbag toward the storage compactly, and the airbag as shrank and gathered toward the storage will provide a sufficient eyesight to the driver who needs to drive the vehicle after airbag deployment.

Therefore, the airbag device for pedestrian protection in accordance with the exemplary embodiment will enable the airbag after deployment to be shrank and gathered toward the storage compactly.

In the airbag device for pedestrian protection in accordance with the exemplary embodiment, each of the plurality of straps is arranged substantially along the circumferential edge of the main body of the protecting sheet with the leading-end portion and base portion joined to the main body due to the continuous slit formed in a vicinity of the circumferential edge of the main body. The leading-end portion is configured to be disconnectable from the main body while the base portion stays joined to the main body. This configuration will facilitate handling of the straps since the straps may be handled integrally with the protecting sheet in the process of folding the protecting sheet together with the airbag.

In one or more embodiment, the protecting sheet may include, in addition to the main body that is configured to extend rearward from the storage at airbag deployment, two connecting portions that extend forward from left and right end portions of the main body as unfolded and are mounted on the storage, and the straps may be located in a front edge of the main body as unfolded. In comparison to an instance where the straps are located in a rear region of the main body, this configuration will shorten a substantial distance between the through holes formed in the wrapping sheet and the straps by the length of the main body, in other words, shorten a circumferential length of a portion of the means for shrinking and tying directly disposed around the airbag or directly tying the airbag, because the portion does not include the main body. That is, since the airbag is tied by the straps and the front portion of the wrapping sheet only, the airbag will be further reduced in size.

In one or more embodiment, the rupturable portion of the wrapping sheet may be formed so that a tab which protrudes partially from surroundings is formed around each of the through holes at rupture of the rupturable portion. The tabs will facilitate the work of passing the straps through the through holes since the tabs protrude partially from an edge of the front portion of the wrapping sheet, thus are easy to find visually and easy to pull by hand.

What is claimed is:

1. An airbag device for pedestrian protection adapted to be mounted on a vehicle, the airbag device comprising:
    a storage that is adapted to be mounted on a vicinity of a rear end of a hood of the vehicle;
    an airbag that is stored in the storage in a folded-up configuration, the airbag being configured to be inflated and deployed over a front surface of at least a lower portion of a windshield of the vehicle;
    a protecting sheet that is formed of a sheet material having flexibility and has been folded together with the airbag and stored in the storage, the protecting sheet being joined to the storage by a front end thereof, the protecting sheet including a main body that is configured to unfold and extend rearward from the storage at airbag deployment to cover an underside of the airbag as deployed, and a plurality of straps that are disposed side by side in a left and right direction of the main body in a circumferential edge of the main body, wherein each of the plurality of straps is arranged substantially along the circumferential edge of the main body with a leading-end portion and a base portion thereof joined to the main body due to a continuous slit formed in a vicinity of the circumferential edge of the main body, and wherein the leading-end portion is configured to be disconnectable from the main body while the base portion is configured to stay joined to the main body; and
    a wrapping sheet that is formed of a sheet material having flexibility and wraps the airbag in order to keep the folded-up configuration of the airbag, the wrapping sheet including a rupturable portion that includes a plurality of intermittent slits extending substantially in a left and right direction of the wrapping sheet and is configured to rupture at airbag deployment to split an entirety of a portion of the wrapping sheet covering an upper surface of the airbag into a front portion and a rear portion, the wrapping sheet further including, in a vicinity of the rupturable portion in the front portion, a plurality of through holes each for receiving a corresponding one of the plurality of straps, whereby at least the front portion of the wrapping sheet and the protecting sheet constitute means for shrinking and tying the airbag after deployment toward the storage by passing each of the plurality of straps with the leading-end portion disconnected from the main body of the protecting sheet through each of the plurality of through holes of the wrapping sheet and tying the leading-end portion of each of the plurality of straps so as to prevent disengagement of the corresponding strap from the through hole.

2. The airbag device for pedestrian protection of claim 1, wherein:
    the protecting sheet further includes two connecting portions that extend forward from left and right end portions of the main body as unfolded and are mounted on the storage; and
    the plurality of straps are located in a front edge of the main body as unfolded.

3. The airbag device for pedestrian protection of claim 2, wherein the rupturable portion of the wrapping sheet is formed so that a tab which protrudes partially from surroundings is formed around each of the through holes at rupture of the rupturable portion.

4. The airbag device for pedestrian protection of claim 2, wherein a width in the left and right direction of the main body of the protecting sheet is substantially the same as that of the storage.

5. The airbag device for pedestrian protection of claim 1, wherein the rupturable portion of the wrapping sheet is formed so that a tab which protrudes partially from surroundings is formed around each of the through holes at rupture of the rupturable portion.

6. The airbag device for pedestrian protection of claim 1, wherein:
    the storage is adapted to be located substantially at a center in a left and right direction of the hood in the vicinity of the rear end of the hood; and the airbag includes a transverse inflatable portion that is configured to be deployed along a left and right direction of the vehicle, substantially along the lower portion of the windshield, and two vertical inflatable portions that are configured to extend rearward from left and right end portions of the transverse inflatable portion and cover front surfaces of lower regions of left and right front pillars of the vehicle.

* * * * *